US012576906B2

(12) United States Patent
Motoishi et al.

(10) Patent No.: US 12,576,906 B2
(45) Date of Patent: Mar. 17, 2026

(54) ELECTRIC ROTATING MACHINE APPARATUS AND ELECTRIC POWER STEERING APPARATUS

(71) Applicant: Mitsubishi Electric Corporation, Tokyo (JP)

(72) Inventors: Naohiro Motoishi, Tokyo (JP); Takahisa Kawaguchi, Tokyo (JP); Kentaro Urimoto, Tokyo (JP); Akira Kimishima, Tokyo (JP); Satoshi Iohara, Tokyo (JP); Yoshikuni Tomioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 889 days.

(21) Appl. No.: 17/796,816

(22) PCT Filed: Mar. 27, 2020

(86) PCT No.: PCT/JP2020/013925

§ 371 (c)(1),
(2) Date: Aug. 1, 2022

(87) PCT Pub. No.: WO2021/192202

PCT Pub. Date: Sep. 30, 2021

(65) Prior Publication Data

US 2023/0049080 A1     Feb. 16, 2023

(51) Int. Cl.
*B62D 5/04*          (2006.01)
*H02K 5/22*          (2006.01)

(52) U.S. Cl.
CPC ........... *B62D 5/0406* (2013.01); *H02K 5/225* (2013.01)

(58) Field of Classification Search
CPC ...... B62D 5/0406; H02K 5/225; H02K 11/33; H02K 11/01
See application file for complete search history.

(56) References Cited

U.S. PATENT DOCUMENTS

| | | | |
|---|---|---|---|
| 2019/0207488 A1 | 7/2019 | Ichikawa et al. | |
| 2019/0393753 A1 | 12/2019 | Tsutsui et al. | |
| 2021/0006134 A1* | 1/2021 | Ichikawa | ................ H02P 25/22 |

FOREIGN PATENT DOCUMENTS

| | | |
|---|---|---|
| CN | 109690921 A | 4/2019 |
| EP | 3 512 078 A1 | 7/2019 |

(Continued)

OTHER PUBLICATIONS

PE2E Translation of JP 2019125549 A (Year: 2019).*

(Continued)

*Primary Examiner* — Jason D Shanske
*Assistant Examiner* — Al-Birr Rahman Chowdhury
(74) *Attorney, Agent, or Firm* — Sughrue Mion, PLLC

(57) ABSTRACT

In an electric rotating machine apparatus according to the present disclosure, noise-removal capability is secured by adopting a structure in which an external terminal is connected with a protruding portion, of a control circuit board in a control unit, that protrudes from a through hole of an electromagnetic shield and in which a filter unit is provided. Because a conventional dedicated wiring board for mounting the filter unit thereon is not required, the foregoing structure can contribute to downsizing and cost reduction. In addition, the foregoing structure can contribute to downsizing and cost reduction of an electric power steering apparatus equipped with the electric rotating machine apparatus according to the present disclosure.

20 Claims, 18 Drawing Sheets

(56)  References Cited

FOREIGN PATENT DOCUMENTS

| EP | 3 972 096 | A1 | | 3/2022 |
|----|-----------|-----|---|--------|
| JP | 2019125549 | A | * | 7/2019 |
| JP | 6608555 | B1 | | 11/2019 |
| WO | 2018/047342 | A1 | | 3/2018 |

OTHER PUBLICATIONS

Fastening Nuts and Bolts: The Basics Written by Robert Ferguson (Year: 2009).*
International Search Report for PCT/JP2020/013925 dated Jun. 23, 2020 [PCT/ISA/210].
Communication issued Mar. 20, 2025 in Chinese application No. 202080098089.3.
Extended European Search Report dated Apr. 13, 2023 in Application No. 20926914.1.

* cited by examiner

ELECTRIC ROTATING MACHINE APPARATUS AND ELECTRIC POWER STEERING APPARATUS

CROSS REFERENCE TO RELATED APPLICATIONS

This application is a National Stage of International Application No. PCT/JP2020/013925 filed Mar. 27, 2020.

TECHNICAL FIELD

The present disclosure relates to an electric rotating machine apparatus and an electric power steering apparatus.

BACKGROUND ART

To date, there has existed an electric rotating machine apparatus in which a control unit is integrated with an electric rotating machine in such a way as to be adjacent to the electric rotating machine in an axial direction of the output axle thereof. A stator, a rotor, and the like are incorporated in the housing of the electric rotating machine. The control unit is provided adjacent to the electric rotating machine in the axial direction of the output axle thereof; the control unit has a control circuit board on which an inverter for making currents flow in stator windings and a control circuit for controlling the inverter are mounted.

As an example of conventional electric rotating machine apparatuses, there exists the one in which there is adopted a so-called principal-constituent-member vertical-arrangement method in which an inverter and a control circuit board are arranged in parallel with each other in an axial direction of the electric rotating machine (e.g., Patent Document 1). In addition, as another example of conventional electric rotating machine apparatuses, there exists the one in which there is adopted a so-called principal-constituent-member horizontal-arrangement method in which an inverter and a control circuit board are arranged perpendicularly to an axial direction of the electric rotating machine and in which the control circuit board and a noise-countermeasure filter board are arranged in a stratified manner (e.g., Patent Document 2).

As far as an electric rotating machine apparatus and an electric power steering apparatus in which an electric rotating machine apparatus is mounted are concerned, especially, as far as an electric rotating machine apparatus in which an electric rotating machine and a control unit are integrated with each other and an electric power steering control apparatus are concerned, noise countermeasures in the control unit is important. Regardless of vertical arrangement or horizontal arrangement of an inverter and a control circuit board, a filter including a noise-countermeasure capacitor and a noise-countermeasure coil is provided as a separate board or with a separate circuit-supporting structure, in such a way as to be disposed separately from the control circuit board.

CITATION LIST

Patent Literature

Patent Document 1: Japanese Patent No. 6608555
Patent Document 2: International Publication No. 2018/047342

There exists an electric rotating machine apparatus in which an electric rotating machine and a control unit are integrated with each other in such a way as to be adjacent to each other in an axial direction of the output axle of the electric rotating machine. In the electric rotating machine apparatus, voltage noise is generated in an inverter for driving the electric rotating machine, an inverter driving circuit, and the like. The generated voltage noise travels in a power source for the electric rotating machine apparatus, a signal terminal, and a board and then propagates to the outside of the electric rotating machine apparatus through a connector. Alternatively, the generated voltage noise travels in a heat sink and the case of the electric rotating machine and then propagates to the outside of the electric rotating machine apparatus through the flange of the electric rotating machine. Accordingly, in order to prevent the noise from propagating to the outside of the electric rotating machine apparatus, a filter and an electromagnetic shield for attenuating the noise are required.

It is desirable that a power module such as the inverter for driving the electric rotating machine and a driving circuit for driving the power module are arranged near to the electric rotating machine so that the wiring leads therefor are shortened. Accordingly, the power module and a control circuit board in which the driving circuit for driving the power module are mounted are adjacently arranged. In addition, it is required that the filter circuit is disposed close to the opening portion of the shield in order to prevent noise from being superimposed again on the wiring lead in which noise has been attenuated. Therefore, it is required that the filter circuit is disposed on a dedicated wiring board on which the filter circuit is to be mounted and that is separated from the control circuit board on which the inverter driving circuit is mounted or that a dedicated circuit-supporting structure is disposed close to the opening portion of the shield. It has been hindrance to downsizing and cost reduction of an electric rotating machine apparatus to provide the dedicated wiring board or the dedicated circuit-supporting structure. Accordingly, it has been hindrance also to downsizing and cost reduction of a power steering apparatus provided with the electric rotating machine apparatus.

SUMMARY OF INVENTION

Therefore, the objective of the present disclosure is to obtain an electric rotating machine apparatus that requires neither the dedicated wiring board on which the filter is mounted nor the dedicated circuit-supporting structure and that is provided with a filter having a high noise-removal capability and to obtain a power steering apparatus provided with such the electric rotating machine apparatus.

Solution to Problem

An electric rotating machine apparatus according to the present disclosure includes an electric rotating machine having a rotation axle,
a control unit that is disposed at one axial-direction side of the rotation axle with respect to the electric rotating machine and controls the electric rotating machine,
a control circuit board that is provided in the control unit and has a protruding portion extending toward the one axial-direction side of the rotation axle,
an electromagnetic shield that surrounds the control unit and is provided with a through hole that is penetrated by the protruding portion of the control circuit board,
an external connection terminal that is disposed outside the electromagnetic shield and is mounted in the protruding portion of the control circuit board, and a filter that is disposed outside the electromagnetic shield and is mounted on the protruding portion of the control circuit board so as to attenuate noise components that propagate to the external connection terminal.

An electric power steering apparatus according to the present disclosure includes the foregoing electric rotating machine apparatus.

Advantage of Invention

In an electric rotating machine apparatus and a power steering apparatus according to the present disclosure, while neither any dedicated wiring board on which a filter is mounted nor any dedicated circuit-supporting structure is required, a filter having noise-removal capability can be provided outside a through hole in an electromagnet shield. Accordingly, because neither any dedicated wiring board for mounting the filter thereon or any dedicated circuit-supporting structure is required, the present disclosure can contribute to downsizing and cost reduction. In addition, the present disclosure can contribute to downsizing and cost reduction of an electric power steering apparatus equipped with the electric rotating machine apparatus according to the present disclosure.

DESCRIPTION OF EMBODIMENTS

Hereinafter, embodiments of the present disclosure will be explained with reference to the drawings.

1. Embodiment 1

Figure 1:
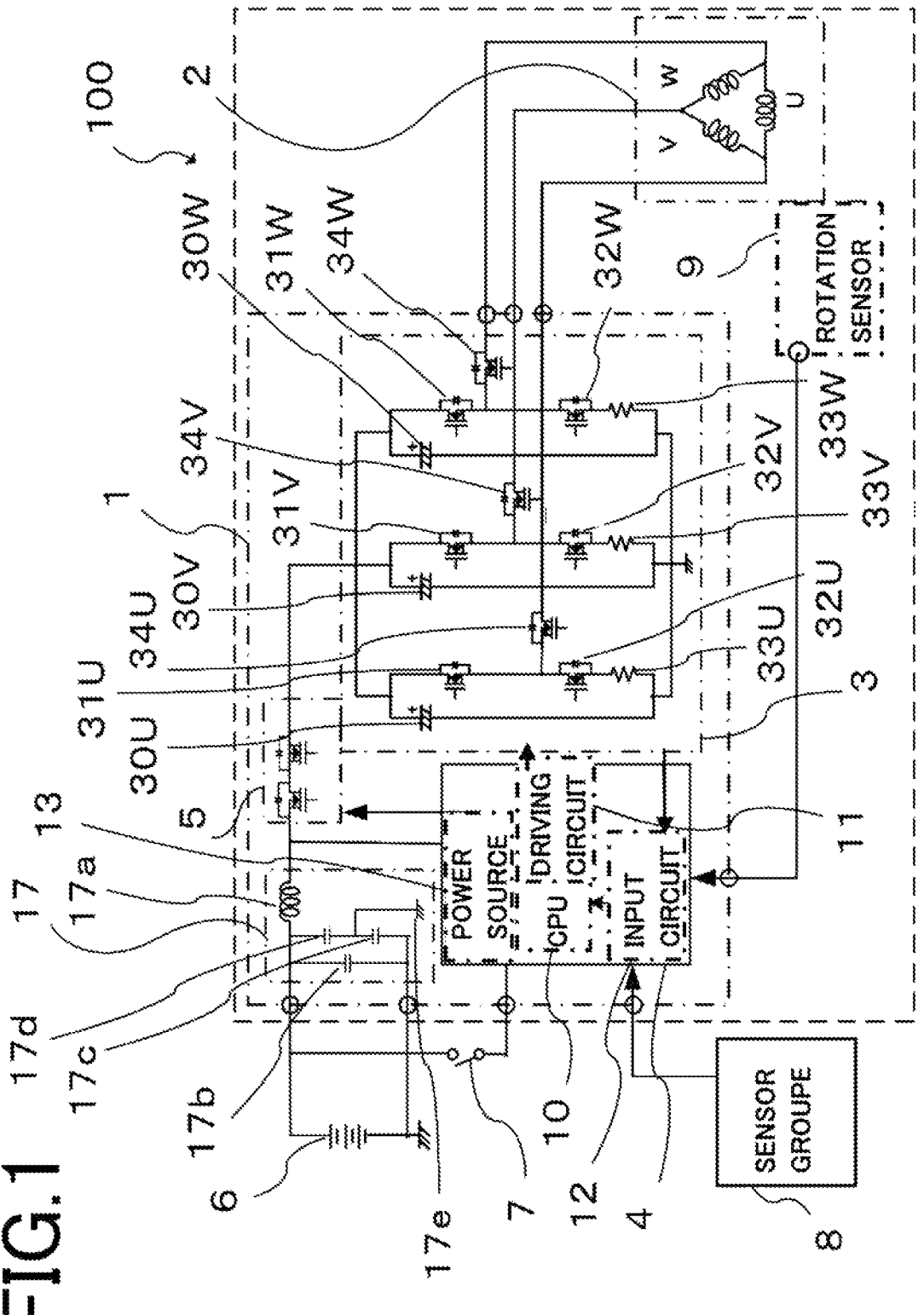
FIG. 1 is a circuit diagram of an electric rotating machine apparatus according to Embodiment 1.
Figure 2:
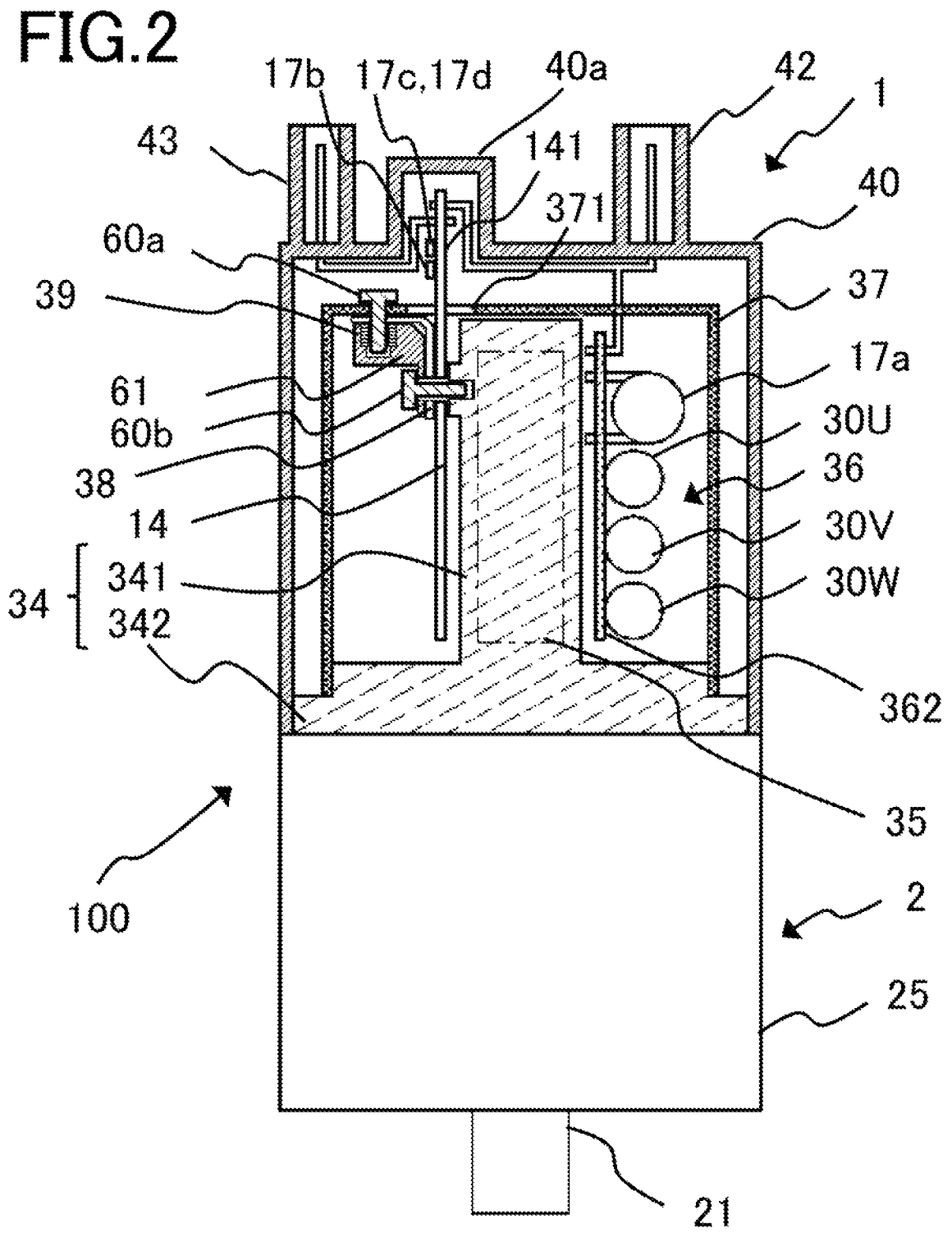
FIG. 2 is a side cross-sectional view of the electric rotating machine apparatus according to Embodiment 1.
Figure 3:
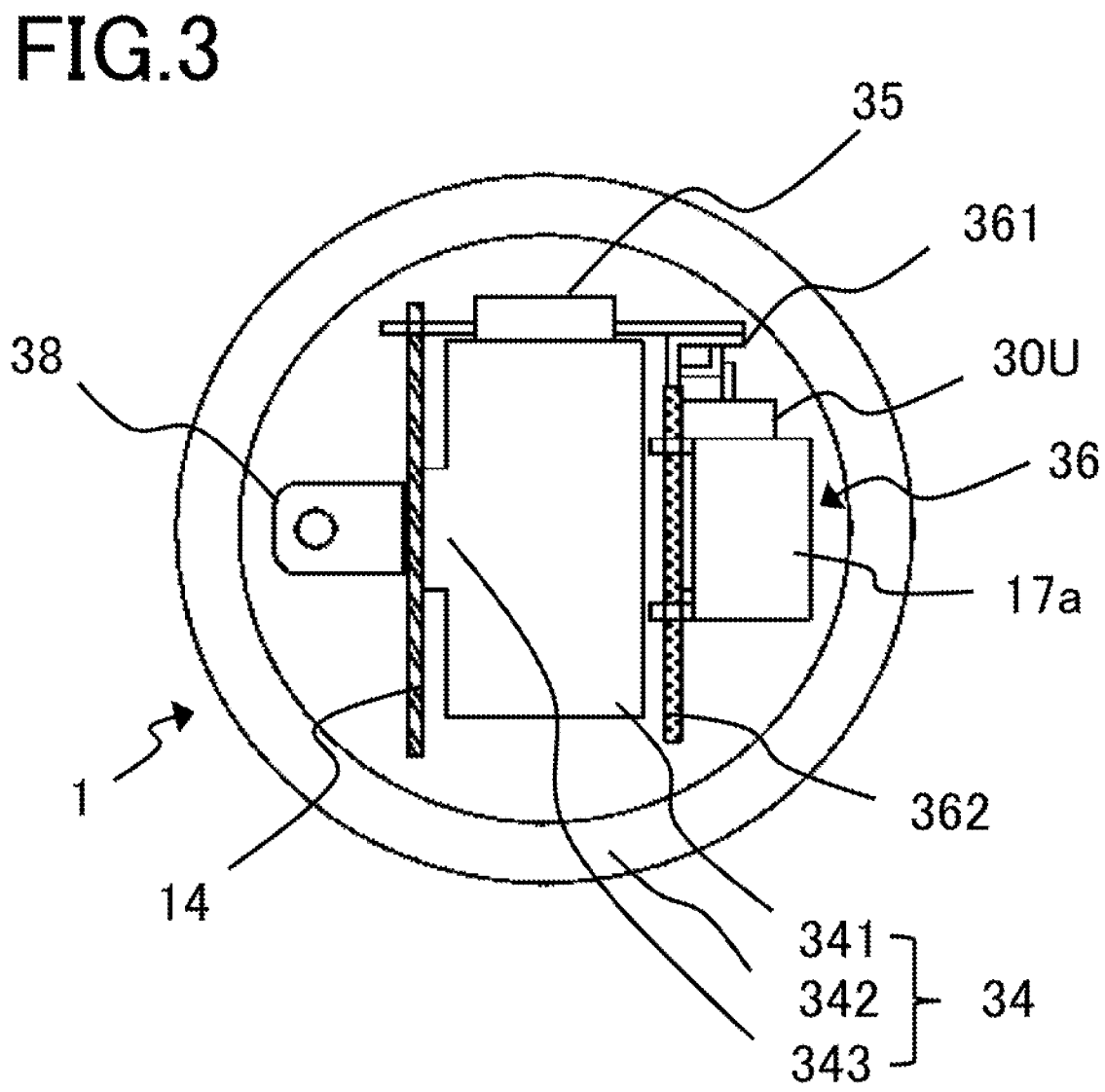
FIG. 3 is a top cross-sectional view of the electric rotating machine apparatus according to Embodiment 1.
Figure 4:
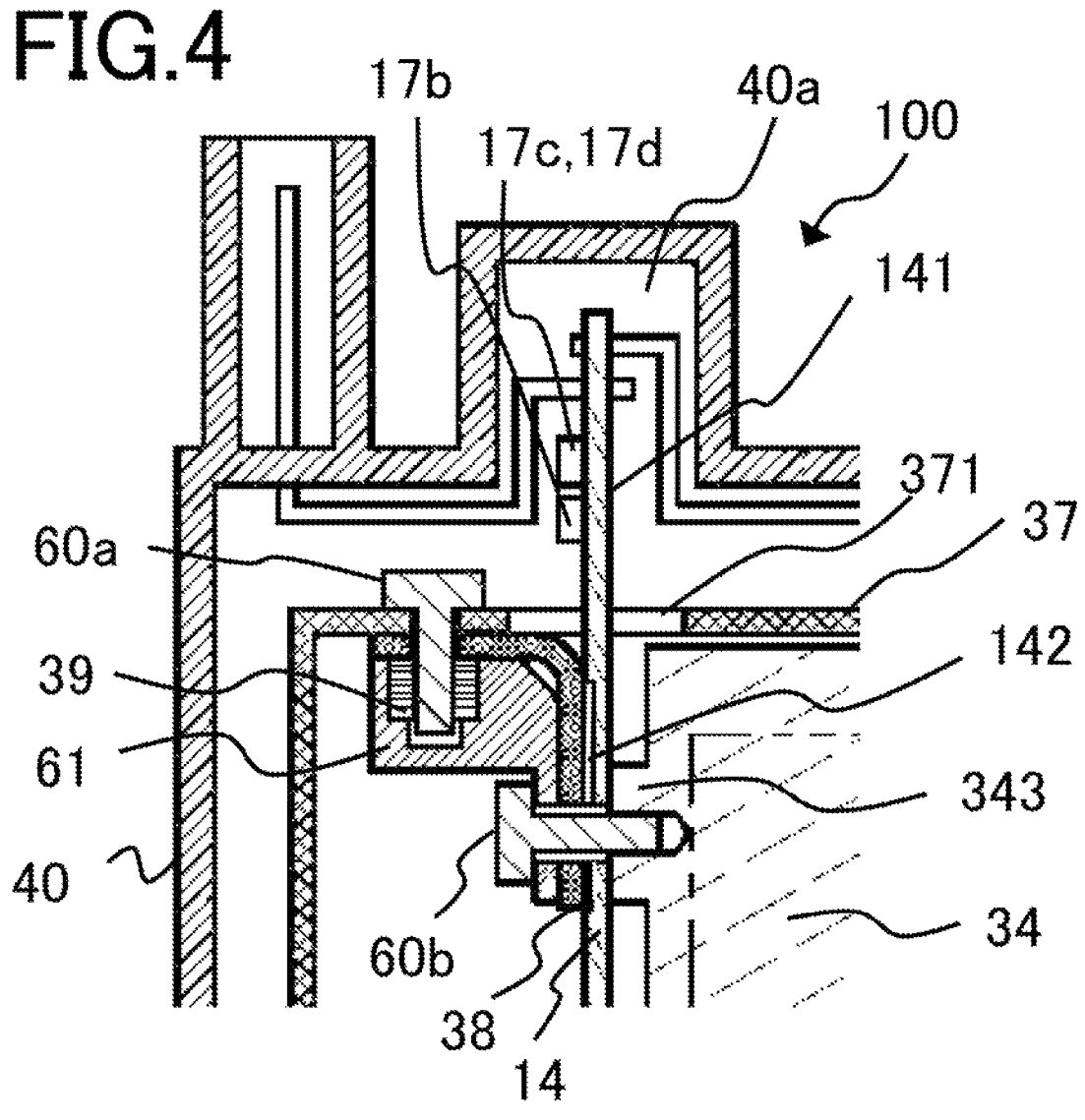
FIG. 4 is an enlarged view of a side cross section, taken along the center axis, of the electric rotating machine apparatus according to Embodiment 1.
Figure 5:
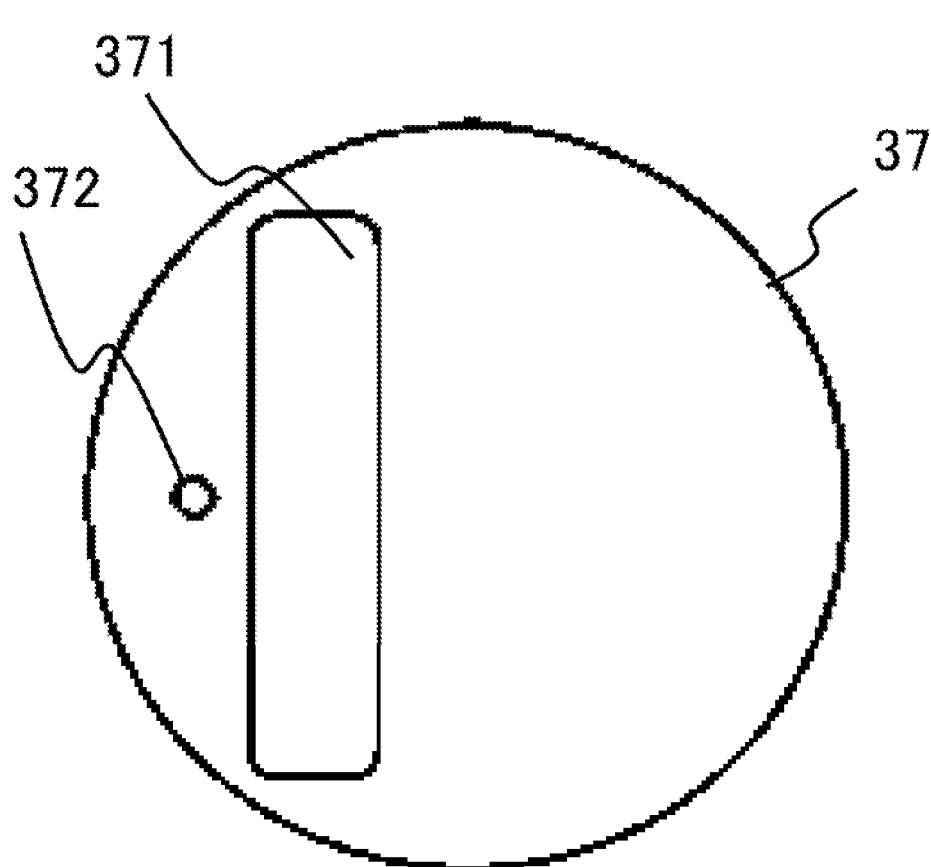
FIG. 5 is a first top view of an electromagnetic shield in the electric rotating machine apparatus according to Embodiment 1.
Figure 6:
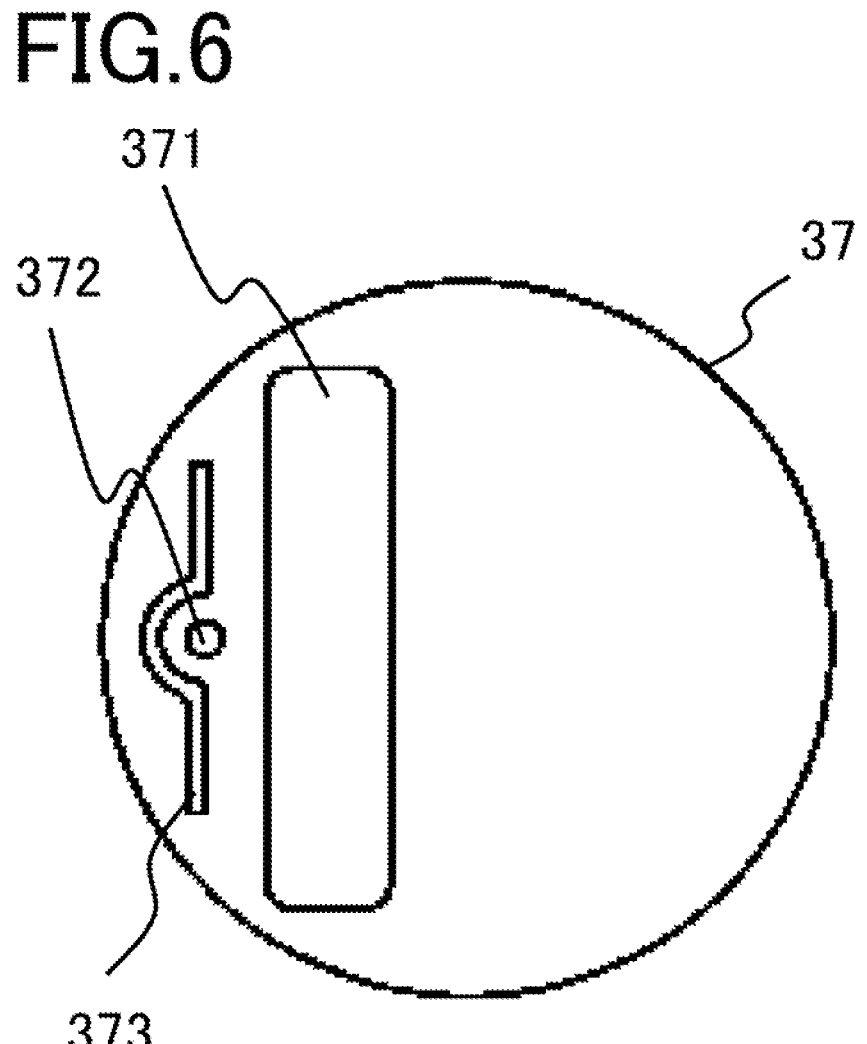
FIG. 6 is a second top view of the electromagnetic shield in the electric rotating machine apparatus according to Embodiment 1.
Figure 7:
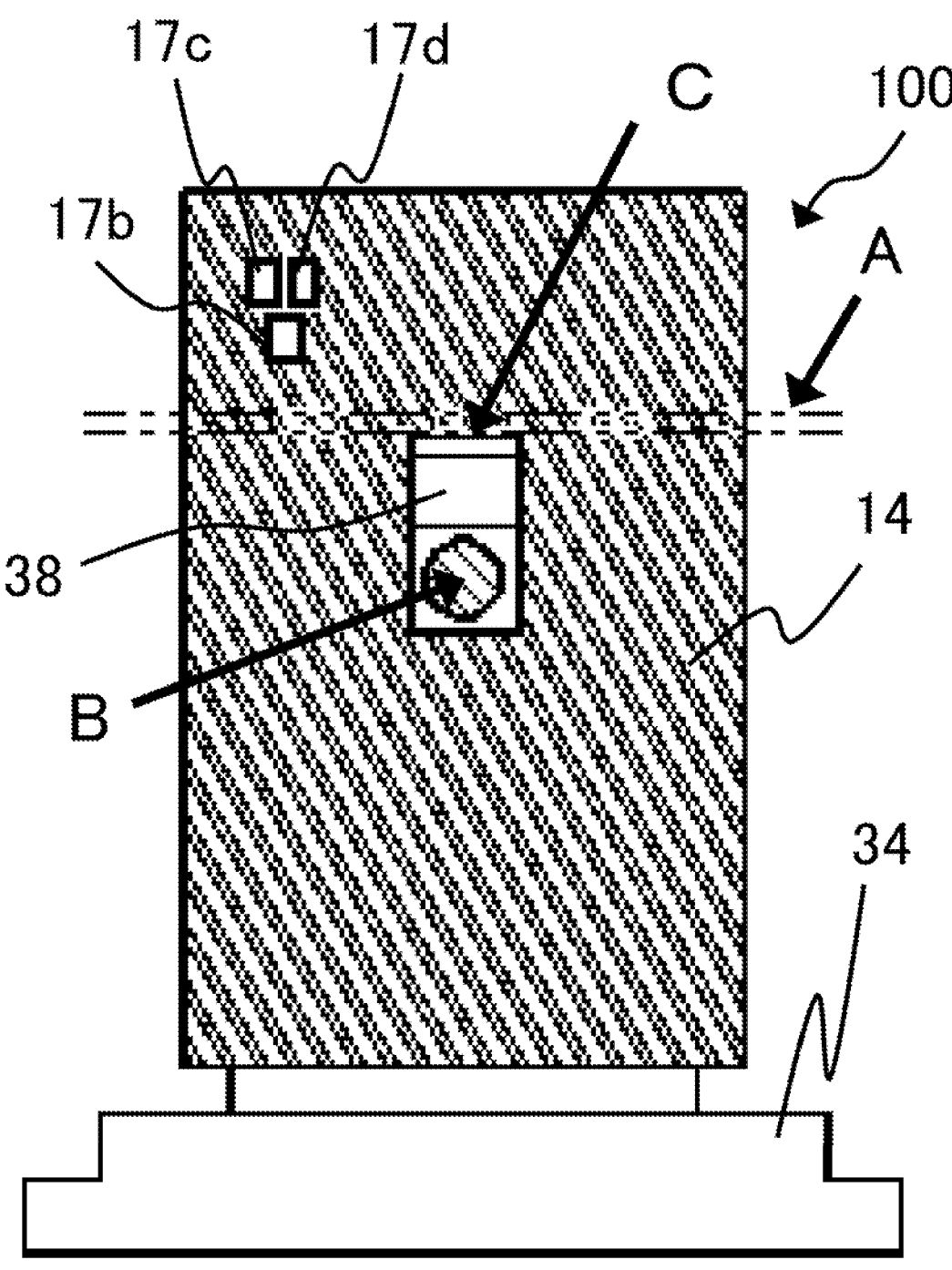
FIG. 7 is a front view of the electric rotating machine apparatus according to Embodiment 1.

Embodiment 1 will be explained. FIG. 1 is a circuit diagram of an electric rotating machine apparatus 100 according to Embodiment 1. FIG. 2 is a side cross-sectional view of the electric rotating machine apparatus 100 according to Embodiment 1. FIG. 3 is a top cross-sectional view of the electric rotating machine apparatus 100 according to Embodiment 1. FIG. 4 is an enlarged view of a side cross section, taken along the center axis, of the electric rotating machine apparatus 100 according to Embodiment 1. FIG. 5 is a first top view of an electromagnetic shield 37 in the electric rotating machine apparatus 100 according to Embodiment 1. FIG. 6 is a second top view of the electromagnetic shield 37 in the electric rotating machine apparatus 100 according to Embodiment 1. FIG. 7 is a front view of the electric rotating machine apparatus 100 according to Embodiment 1.

<Circuit Configuration>

In FIG. 1, the circuit diagram of the electric rotating machine apparatus 100 represents a control unit 1 and an electric rotating machine 2. The electric rotating machine apparatus 100 may be either the one in which a control circuit and a Y-connected or delta-connected three-phase brushless electric rotating machine are integrated with each other or the one that has a function of utilizing regenerative electric power, generated by driving a load, for charging a battery. The electric rotating machine apparatus 100 is utilized not only in an electric power steering apparatus 150 but also in various uses including vehicle-wheel driving.

The control unit 1 includes an inverter circuit 3 for supplying an electric current to the electric rotating machine 2, a control circuit unit 4 in which a CPU (Central Processing Unit) 10 is mounted, power-relay switching devices 5, and a filter unit 17. The filter unit 17 is provided for suppressing noise generated by the inverter circuit 3.

The filter unit 17 is connected with a power source and GND (Ground) from a battery 6. The power source is provided to a power-source circuit 13 in the control circuit unit 4 through an ignition switch 7. A sensor group 8 is connected with an input circuit 12 in the control circuit unit 4. The sensor group includes, for example, a steering angle sensor that is mounted close to a steering wheel and detects a steering angle, a torque sensor for detecting steering torque, and a speed sensor for detecting a vehicle traveling speed. A signal from the power-source circuit 13 makes the power source travel through the filter unit 17 and the power-relay switching devices 5; then, the power source becomes a current source for the inverter circuit 3. The filter unit 17 includes a normal mode coil 17a, capacitors 17b, 17c, and 17d. In accordance with noise generated by the electric rotating machine apparatus 100, an unillustrated common mode coil may be added thereto, the normal mode coil can be removed, or the number of the capacitors can be reduced.

The information items from the sensor group 8 are transmitted to the CPU 10 by way of the input circuit 12 of the control circuit unit 4. Based on those information items, the CPU 10 calculates and outputs a control amount corresponding to an electric current for making the electric rotating machine 2 rotate. The output signal of the CPU 10 is transmitted to the inverter circuit 3 by way of a driving circuit 11 included in an output circuit. The driving circuit 11 is disposed within the control circuit unit 4, because only a small electric current flows therein; physically, the driving circuit 11 is mounted on a control circuit board 14 along with the CPU 10, the power-source circuit 13, and the input circuit 12. However, the driving circuit 11 can also be disposed within a power module 35 along with the inverter circuit 3.

The inverter circuit 3 includes upper-arm switching devices 31U, 31V, and 31W and lower-arm switching devices 32U, 32V, and 32W for three-phase windings U, V, and W of the electric rotating machine 2 and electric-rotating-machine relay switching devices 34U, 34V, and 34W for connecting/disconnecting wiring leads between the electric-rotating-machine wirings and the inverter circuit 3. The inverter circuit 3 further includes current-detection shunt resistors 33U, 33V, and 33W and smoothing capacitors 30U, 30V, and 30W. Because having the same circuit configuration for each of the windings of the respective phases, the inverter circuit 3 can supply electric currents independently to the windings of the respective phases.

In addition, although not illustrated, respective electric potential differences across the shunt resistors 33U, 33V, and 33W, winding-terminal voltages of the electric rotating machine 2, and the like are fed back to the input circuit 12. These information items are also inputted to the CPU 10; the first CPU 10 calculates the difference between the calculated current value and a detection value and then performs feedback control so as to supply a desired electric-rotating-machine current and to operate the electric rotating machine.

Moreover, the driving circuit 11 also outputs a driving signal for the power-relay switching device 5 that operates as a relay for performing connection/disconnection between the battery 6 and the power-source wire leads of the inverter circuit 3; thus, the switching element can cut off supply of the electric current to the electric rotating machine 2 itself. The electric-rotating-machine relay switching devices 34U, 34V, and 34W are also provided in the inverter circuit 3 and can cut off the respective phases. In addition, a large electric current flows and hence heat is generated in the power-relay switching device 5; thus, it may be allowed that the power-relay switching device 5 is disposed not in the control circuit board 14 but in the power module 35 in which the inverter circuit 3 is incorporated.

The CPU 10 has an abnormality detection function of detecting an abnormality in the sensor group 8, the driving circuit 11, the inverter circuit 3, the electric-rotating-machine wiring, or the like; when an abnormality is detected, in order to cut off current supply, for example, only for a predetermined phase in accordance with the abnormality, the CPU 10 turns off the corresponding-phase upper-arm switching devices 31U, 31V, and 31W, the corresponding-phase lower-arm switching devices 32U, 32V, 32W, or the corresponding-phase electric-rotating-machine relay switching devices 34U, 34V, 34W. Furthermore, it is also made possible that in order to cut off all the electric currents, the power-relay switching device 5 is turned off so that the power source itself is cut off.

The electric rotating machine 2 is a brushless electric rotating machine in which three-phase windings are delta-connected. Because being a brushless electric rotating machine, the electric rotating machine 2 is provided with a rotation sensor 9 for detecting the rotation position of the rotor. The rotation information is also fed back to the input circuit 12. It may be allowed that the electric rotating machine 2 is not three-phase delta-connected brushless electric rotating machine but either a Y-connected brushless electric rotating machine or an electric rotating machine having dipole-two-pair brushes. Moreover, as is the case with the winding specification of a conventional apparatus, either distributed winding or concentrated winding can be adopted.

Next, the periphery of the filter unit 17 will be explained. PWM (Pulse Width Modulation) control of the inverter circuit 3 in the control unit 1 generates switching noise. The filter unit 17 is provided in order to prevent the switching noise from being transferred from the electric rotating machine apparatus 100 to the outside. The coil 17a is the one for normal-mode noise and is called a "normal mode coil". In addition, although not illustrated, it may be allowed that a coil that is the one for common-mode noise and is called a "common mode coil" is added.

The capacitor 17b is the one that is called an "across-the-line capacitor" or an "X capacitor". Each of the capacitors 17c and 17d is the one that is called a "line-bypass capacitor" or a "Y capacitor". The filter unit 17 suppresses conductive noise and radiation noise by use of these filter elements and is called an "EMI (Electromagnetic Interface) filter". In addition, the middle point 17e between the Y capacitors 17c and 17d is a body ground and is electrically connected with the vehicle body by way of part of the electric rotating machine apparatus 100 so as to be grounded.

<Physical Configuration>

FIG. 2 is a side cross-sectional view for explaining the physical configuration of the electric rotating machine apparatus 100 according to Embodiment 1; the control unit 1 is cut at a cross section including the center axis of the electric rotating machine 2. The electric rotating machine 2 disposed at the lower side of FIG. 2 and the control unit 1 disposed at the upper side of FIG. 2 are integrated with and adjacent to each other in the axial direction of the output axle 21 of the electric rotating machine 2. As is the case with a conventional apparatus, the electric rotating machine 2 is incorporated in an electric-rotating-machine case 25; in the periphery of the output axle 21, there are arranged a rotor in which unillustrated permanent magnets in two or more pole pairs are arranged and a stator that is spaced apart from the rotor and around which winding are wound. The respective windings are wound for the three phases; the end portions of the respective phases extend toward the control unit 1 for the sake of connection.

The top portion and the outer circumference of the control unit 1 are covered with a housing 40; on the top portion of the housing, there are arranged a power-source connector 42 where a relatively large power-source-system current flows and a signal connector 43 where a relatively small signal-system current flows. The power-source connector 42, the signal connector 43, and the housing 40 are integrally molded with one another by means of a resin material.

FIG. 3 is a top cross-sectional view of the electric rotating machine apparatus 100 according to Embodiment 1; it is a drawing illustrating the control unit 1, when the control unit 1 is cut beneath the ceiling surface of the electromagnetic shield 37 and is viewed from the power-source connector side. In the control unit 1, a heat sink 34 is disposed at the middle portion thereof inside the housing 40.

In the middle of the heat sink 34, there is disposed a columnar portion 341 whose cross section is formed in the shape of a rectangular column. The control circuit board 14 is vertically disposed along the side surface of one of the long sides of the columnar portion 341 of the heat sink 34. A bus bar unit 36 is disposed at the side surface of the other one of the long sides of the columnar portion 341 of the heat sink 34.

The power module 35 is vertically disposed along the side surface of one of the short sides of the columnar portion 341 of the heat sink 34. The power module 35 has a control-circuit-board connecting terminal at one side thereof along the short side and a bus-bar-unit connecting terminal at the other side thereof. The control-circuit-board connecting terminal is connected through soldering; the bus-bar-unit connecting terminal is connected through TIG (Tungsten Insert Gas) welding or the like. The power module 35 is provided behind the heat sink and is disposed at the position indicated by a double-dot chain line in FIG. 2.

The heat sink 34 includes the foregoing columnar portion 341 and a ring-shaped base portion 342 fixed to one longitudinal-direction end portion of the columnar portion 341. The columnar portion 341 of the heat sink 34 is disposed in the central portion of the housing 40 in such a way that the longitudinal direction thereof is along the axis line of the housing 40 of the control unit 1. The base portion 342 of the heat sink 34 is supported by the electric-rotating-machine case 25 in such a way that the outer circumferential surface thereof is inscribed in the inner circumferential surface of the electric-rotating-machine case 25. That is to say, the heat sink 34 is disposed in such a way that the base portion 342 thereof is fixed to the electric-rotating-machine case 25 and that the columnar portion 341 supported in a cantilever manner by the base portion 342 protrudes toward the inner space of the housing 40.

An insertion hole is provided in the base portion 342 of the heat sink 34. The respective end portions of the three phases of the electric rotating machine 2 pass through the insertion hole and are connected with the bus bars of the bus bar unit 36 in the control unit 1 (unillustrated).

The base portion 342 of the heat sink 34 is formed in a stepped shape. The electric-rotating-machine case 25 is fixed to the outer circumference of the larger-diameter portion of the base portion 342. The metal and cylindrical tubular electromagnetic shield 37 for suppressing noise emission is fixed to the outer circumference of the smaller-diameter portion of the base portion 342.

The electromagnetic shield 37 is disposed in such a way as to cover the columnar portion 341 of the heat sink 34, the control circuit board 14, the bus bar unit 36, and the power module 35; part of the control circuit board 14 protrudes to the outside of the electromagnetic shield 37 through a through hole 371 in the top portion of the electromagnetic shield 37. In FIG. 2, only the control circuit board 14 protrudes from the through hole 371 in the top portion of the electromagnetic shield 37. However, part of the heat sink 34 or part of the bus bar unit 36 may protrude from the through hole 371.

The bus bar unit 36 includes a bus-bar holder 362 in which a bus bar 361 is embedded in a resin member, the smoothing capacitors 30U, 30V, and 30W, and the normal mode coil 17a. The bus bar 361 is connected with the respective end portions of the windings of the three phases of the electric rotating machine 2, the connection terminal of the power module 35, the respective terminals of the smoothing capacitors 30U, 30V, and 30W and the normal mode coil 17a, and the respective terminals of the power source and GND extended from the power-source connector 42.

<Filter Circuit>

The control circuit unit 4, the power-relay switching device 5, and the filter unit 17 in FIG. 1 are mounted on the control circuit board 14. On the control circuit board 14, there are mounted circuit components for controlling the inverter circuit 3 that supplies electric currents to the electric rotating machine 2. The X capacitor 17b and the Y capacitors 17c and 17d included in the filter are arranged on a protruding portion 141, of the control circuit board 14, that protrudes from the through hole 371 in the top portion of the electromagnetic shield 37. In addition, the protruding portion 141 of the control circuit board 14 is connected with respective external connection terminals, of the power source and the ground, that extend from the power-source connector 42; the filter unit 17 prevents noise from leaking out to the outside through these connection terminals. In FIG. 2, the X capacitor and the Y capacitors are arranged on the outer circumferential side of the protruding portion 141; however, the X capacitor and the Y capacitors may be arranged on the inner circumferential side of the protruding portion 141. In addition, in the foregoing explanation, the normal mode coil 17a is disposed on the bus bar unit 36; however, the normal mode coil 17a may be disposed on the protruding portion 141. Because it is not required to provide a board dedicated to the filter circuit or a circuit-supporting structure dedicated to the filter circuit, the control unit can be configured compactly and inexpensively. These components are incorporated in the housing 40 so as to be protected. Because being incorporated in the housing 40, the components can escape from being broken; thus, the electric rotating machine apparatus 100 can readily be handled.

In Embodiment 1, because the capacitor 17b, which is the X capacitor of the filter circuit, and the capacitors 17c and 17d, which are the Y capacitors thereof, are arranged on the top portion of the control circuit board 14, it is not required to provide a board dedicated to the filter circuit or a circuit-supporting structure dedicated to the filter circuit; therefore, the control unit can be configured compactly and inexpensively. In addition, effective noise countermeasures can be made by providing the filter unit 17 having noise-removal capability, outside the through hole 371 in the electromagnetic shield 37. Because the X capacitor and the Y capacitors are grounded not through the heat sink 34 close to the power module and the paths thereof, which are noise sources, but through the electromagnetic shield 37, noise can be suppressed.

Moreover, because being disposed in a concave portion inside a convex portion 40a provided in the top portion of the housing 40, the protruding portion 141 suppresses the electric rotating machine apparatus 100 from being upsized. In other words, because the ceiling surface of the housing 40 of the control unit 1 in the electric rotating machine apparatus 100, except for the convex portions such as the convex portion 40a, the power-source connector 42, and the signal connector 43, can be kept compact, the downsizing can successfully be realized.

<Grounding Bus Bar>

An L-shaped grounding bus bar 38 is disposed along the outer circumferential side of the control circuit board 14 and the lower side of the ceiling surface of the electromagnetic shield 37.

FIG. 4 is an enlarged view of a side cross section, taken along the center axis, of the electric rotating machine apparatus 100 according to Embodiment 1; FIG. 4 represents the connection between the control circuit board 14 and the electromagnetic shield 37. The grounding bus bar 38 is formed in an L-shaped manner; the horizontal surface thereof abuts on the inside of the top surface of the electromagnetic shield 37 so as to be electrically connected therewith. The vertical surface thereof abuts on a GND strip conductor (GND pattern) 142 of the control circuit board 14 so as to be electrically connected therewith.

A hexagonal nut 39 is disposed beneath the portion, of the grounding bus bar 38, that makes contact with the electromagnetic shield 37 and is supported by a resin holder 61. A screw 60a is screwed from the upper side of the top surface of the electromagnetic shield 37, so that the grounding bus bar 38 and the lower side of the top surface of the electromagnetic shield 37 are adhered to and electrically connected with each other. The resin holder 61 disposed beneath the grounding bus bar 38 holds the hexagonal nut 39 so as to apply rotation locking thereto. The resin holder 61 holding the hexagonal nut 39 is assembled into the grounding bus bar 38 through press-fitting or the like.

From the top surface, the electromagnetic shield 37, the grounding bus bar 38, and the hexagonal nut 39 are assembled in that order; then, from the topmost position, the screw 60a is fastened. Assembling in the foregoing manner prevents any obstructive structure from protruding to the space above the screw 60a when the electromagnetic shield 37 and the grounding bus bar 38 are electrically connected. Because it is not required to secure the distance between the electromagnetic shield 37 of the control unit 1 and the housing 40, this method contributes to downsizing of the control unit 1 in the axial direction.

The vertical surface of the grounding bus bar 38 is electrically connected with the GND strip conductor 142 of the control circuit board 14. The GND strip conductor 142 is included in the filter unit 17, along with the X capacitor 17b, and the Y capacitors 17c and 17d arranged on the control circuit board. A screw 60b fastens the surface, facing the control circuit board 14, of the grounding bus bar 38 from the outer circumferential side. The screw 60b fixes the vertical portion of the resin holder 61, the vertical portion of the grounding bus bar 38, and the control circuit board 14 to a screw-fastening foundation 343 of the heat sink 34. Due to the fastening with the screw 60b, the grounding bus bar 38 and the GND strip conductor 142 of the filter unit 17 are electrically connected with each other. Because the GND strip conductor 142 is included in the filter unit 17, high-reliability and low-cost connection can be performed.

The screw 60b is electrically connected with the heat sink 34 through screw fastening. However, because each of the resin holder 61 and the heat sink 34 side of the control circuit board 14 is insulated, neither the electromagnetic shield 37 nor the GND strip conductor 142 of the control circuit board 14 is electrically connected with the screw 60b and the heat sink 34. Because the X capacitor 17b and the Y capacitors 17b and 17c of the filter circuit are arranged on the top portion of the control circuit board 14, it is not required to provide a board dedicated to the filter circuit or a circuit-supporting structure dedicated to the filter circuit. Accordingly, the control unit can be configured compactly and inexpensively. Moreover, because the X capacitor and the Y capacitors are grounded not through the heat sink 34 close to the power module and the paths thereof, which are noise sources, but through the electromagnetic shield 37, noise can be suppressed.

There is adopted a structure in which fastening is performed with the screw 60b from the outer circumferential side of the center axis of the electric rotating machine; the vertical surface of the grounding bus bar 38 is disposed at the outer circumferential side of the control circuit board 14.

As a result, the constituent portion for connecting the electromagnetic shield 37 with the grounding bus bar 38 is prevented from protruding to the upper surface of the heat sink 34 and wasting the space; thus, this method can contribute to downsizing of the control unit 1.

<Electromagnetic Shield>

FIG. 5 is a first top view of the electromagnetic shield 37 in the electric rotating machine apparatus 100 according to Embodiment 1. In the top surface of the electromagnetic shield 37, there are provided the through hole 371 for making the control circuit board 14 protrude and a screw insertion hole 372 for making the screw 60b pass therethrough.

FIG. 6 is a second top view of the electromagnetic shield 37 in the electric rotating machine apparatus 100 according to Embodiment 1. FIG. 6 is different from FIG. 5 in that a notched hole 373 for facilitating the electromagnetic shield 37 to deform is provided around the screw insertion hole 372. As the shape of the electromagnetic shield 37 of the electric rotating machine apparatus 100 according to Embodiment 1, various shapes including the variations illustrated in FIGS. 5 and 6 are conceivable. Although not illustrated, other holes such as the one for positioning at a time of assembly and the like may be provided. Moreover, it may be allowed that the through hole 371 is enlarged so that part of the top portion of the heat sink 34 or the bus bar unit 36 protrudes from the electromagnetic shield 37.

FIG. 7 is a front view of the electric rotating machine apparatus 100 according to Embodiment 1. FIG. 7 is a front view of the control circuit board 14 at a time when the housing 40 of the control unit and the electromagnetic shield 37 are removed. The grounding bus bar 38 for connecting the control circuit board 14 with the electromagnetic shield 37 is disposed at the center of the control circuit board 14.

The portion of the double-dot chain line, indicated by the arrow A in FIG. 7, is the position of the ceiling surface of the electromagnetic shield 37. The arrow B indicates the position at which the screw 60b is screwed into the control circuit board 14. The arrow C indicates the position where the screw 60a connects the grounding bus bar 38 with the electromagnetic shield 37.

In FIG. 7, both the screws 60a and 60b are arranged on one and the same plane that encompasses the center axis of the electric rotating machine 2. Because it is made possible that both the screws 60a and 60b fix the control circuit board 14 to the electromagnetic shield 37 in the horizontal-direction center in FIG. 7, this arrangement has an advantage in terms of the vibration resistance and the durability.

In each of FIGS. 4 and 7, the screw 60b is disposed perpendicularly to the ceiling surface of the electromagnetic shield 37. The screw 60b is disposed perpendicularly to the control circuit board 14. Arranging the screws 60a and 60b perpendicularly to the respective subjects in the foregoing manner makes it possible that the subjects are securely fixed without loosening; thus, this arrangement is significant and has an advantage in terms of the vibration resistance and the durability.

2. Embodiment 2

Figure 8:
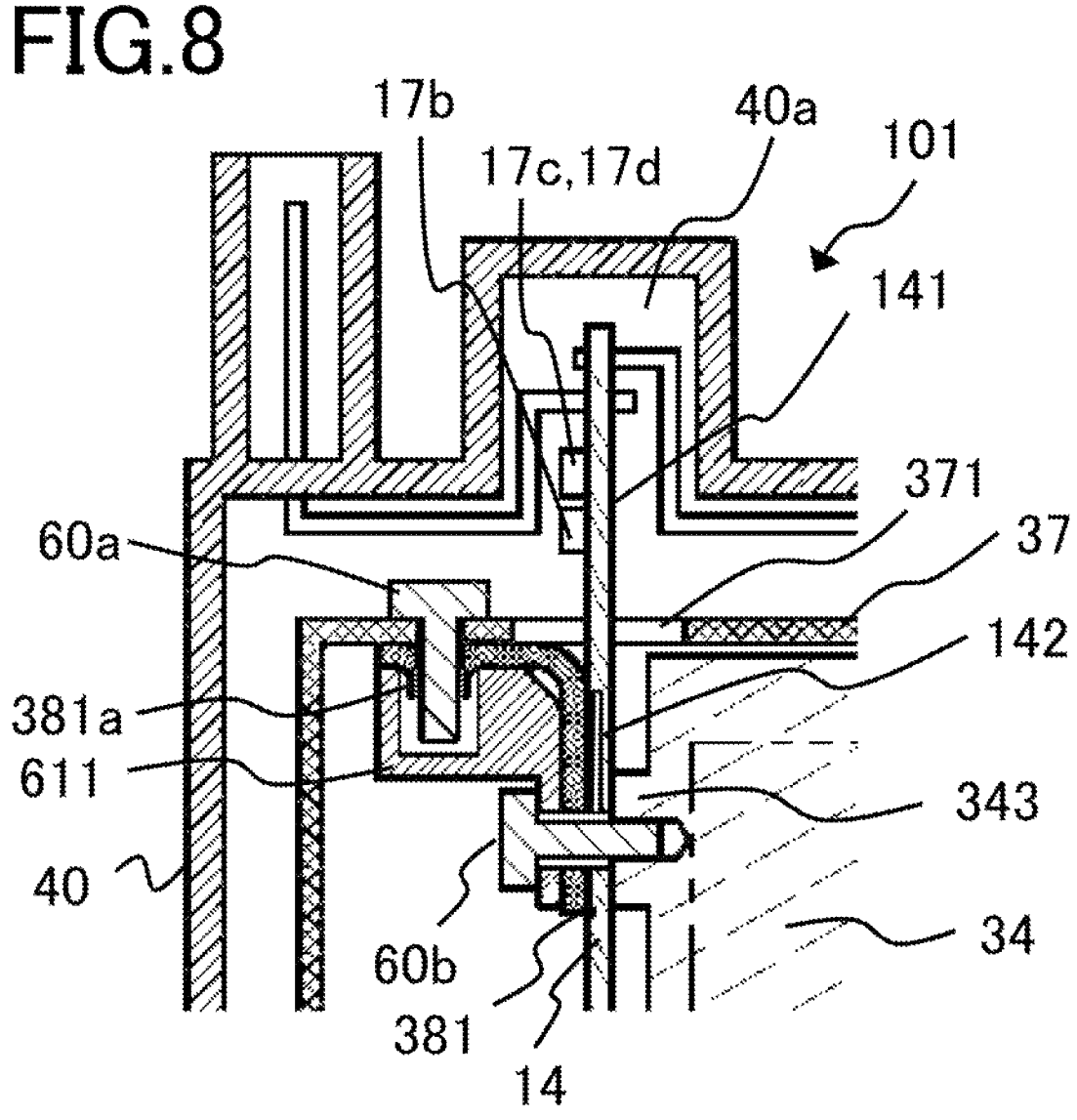
FIG. 8 is an enlarged view of a side cross section, taken along the center axis, of an electric rotating machine apparatus according to Embodiment 2.

FIG. 8 is an enlarged view of a side cross section, taken along the center axis, of an electric rotating machine apparatus 101 according to Embodiment 2.

FIG. 8 is different from FIG. 4 according to Embodiment 1 in that instead of utilizing the hexagonal nut 39 for fixing the screw 60a, burring and threading are applied to a grounding bus bar 381 so as to form a female screw portion 381*a*. The female screw portion 381*a* is provided in the grounding bus bar 381, and the screw 60*a* connects the electromagnetic shield 37 with the grounding bus bar 381.

In FIG. 8, a resin holder 611 in which the front end of the screw 60*a* is incorporated is disposed beneath the grounding bus bar 381. As is the case with Embodiment 1, the resin holder 611 is disposed in such a way as to extend to the side where the screw 60*b* fastens the grounding bus bar 381 to the control circuit board 14 together. The resin holder 611 is utilized as an insulating material at a time when the screw 60*b* fastens the grounding bus bar 381 and the control circuit board 14 to the heat sink 34. In addition, the resin holder 611 is assembled in the grounding bus bar 381 through press-fitting or the like.

This method makes it possible to connect the electromagnetic shield 37 with the grounding bus bar 381 without utilizing the hexagonal nut 39; thus, the electric rotating machine apparatus 101 can be configured at lower cost.

3. Embodiment 3

Figure 9:
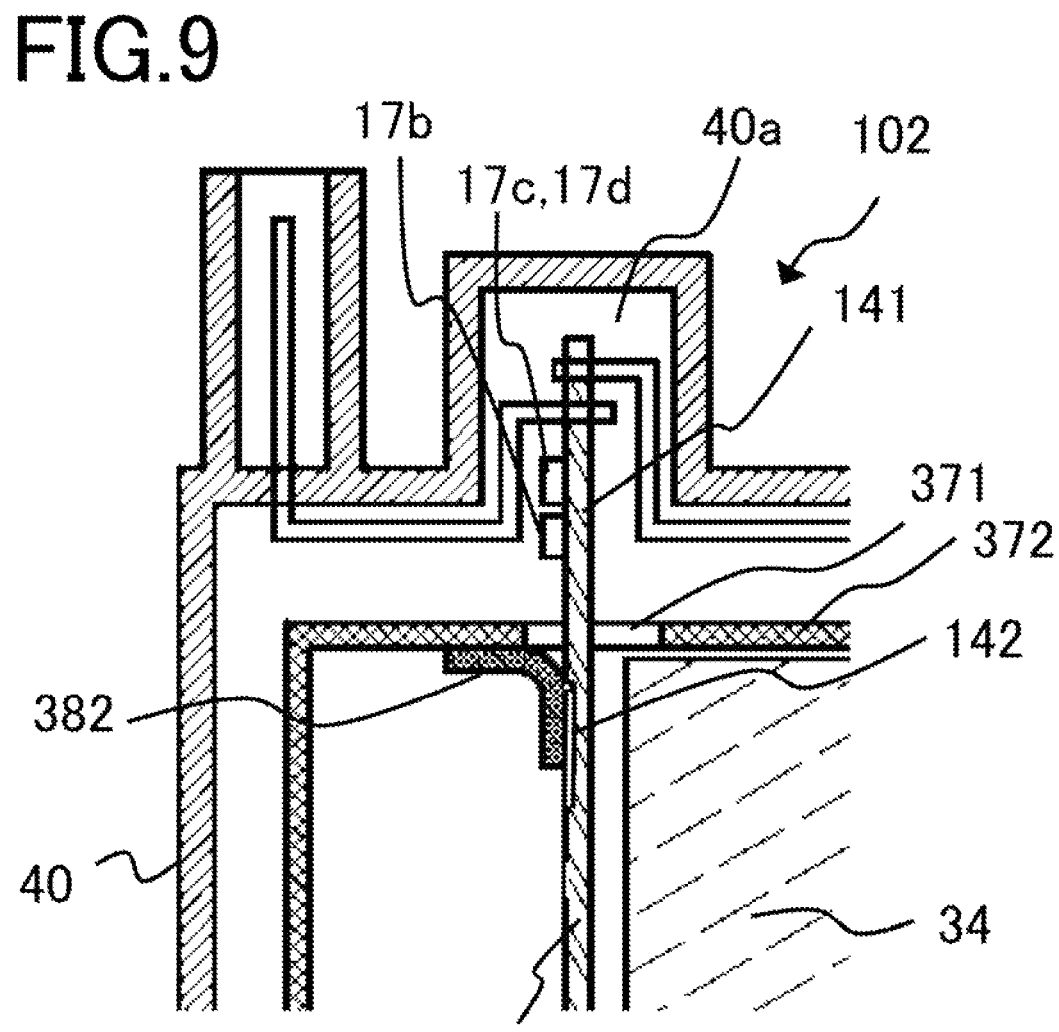
FIG. 9 is an enlarged view of a side cross section, taken along the center axis, of an electric rotating machine apparatus according to Embodiment 3.

FIG. 9 is an enlarged view of a side cross section, taken along the center axis, of an electric rotating machine apparatus 102 according to Embodiment 3.

FIG. 9 is different from FIG. 4 according to Embodiment 1 in that instead of the grounding bus bar 38 to be fixed by use of the screws 60*a* and 60*b*, there is provided a grounding bus bar 382 that keeps electric connection through soldering and pressing contact.

With regard to connection with the control circuit board 14, the grounding bus bar 382 is surface-mounted on the GND strip conductor 142 to be connected with the filter unit 17 on the control circuit board 14, by means of reflow soldering. With regard to electric connection with the electromagnetic shield 372, the control circuit board 14 is assembled into the heat sink 34 in such a way that the inside of the top surface of the electromagnetic shield 372 abuts on the grounding bus bar 382 that is being warped. Because this method can remove the screws 60*a* and 60*b* and the resin holder 61, the electric rotating machine apparatus 102 can be configured with a small number of components. Accordingly, this method can contribute to cost reduction.

In Embodiment 3, as the grounding bus bar 382, there can be utilized a leaf-spring-like elastic member that can be mounted on the control circuit board 14. Use of the leaf-spring-like elastic member makes it possible that the electric connection with the electromagnetic shield 372 is more secured by use of a warp and repulsive force.

4. Embodiment 4

Figure 10:
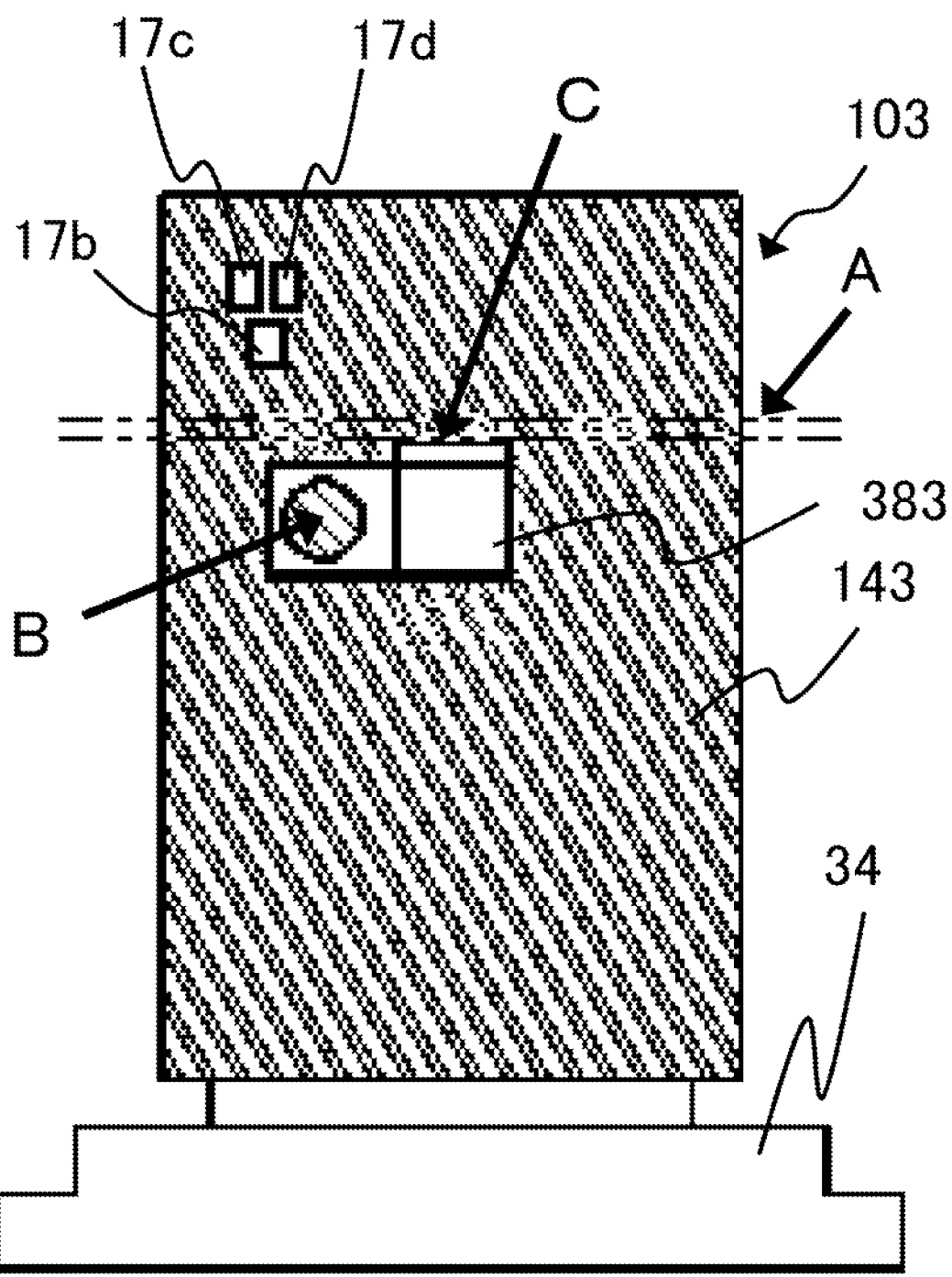
FIG. 10 is a front view of an electric rotating machine apparatus according to Embodiment 4.

FIG. 10 is a front view of an electric rotating machine apparatus 103 according to Embodiment 4.

FIG. 10 is a front view of a control circuit board 143 at a time when the housing 40 of the control unit and the electromagnetic shield 37 are removed. The grounding bus bar 383 for connecting the control circuit board 143 with the electromagnetic shield 37 is disposed close to the center of the control circuit board 143.

The portion of the double-dot chain line, indicated by the arrow A in FIG. 10, is the position of the ceiling surface of the electromagnetic shield 37. The arrow B indicates the position at which the screw 60*b* is screwed into the control circuit board 143. The arrow C indicates the position where the screw 60*a* connects the grounding bus bar 383 with the electromagnetic shield 37.

In FIG. 10, the center axis of the screw 60*a* is disposed on a first plane parallel to the center axis of the electric rotating machine 2, and the center axis of the screw 60*b* is disposed on a second plane parallel to the first plane. This arrangement makes it possible that both the screws 60*a* and 60*b* each fix the control circuit board 14 to the electromagnetic shield 37.

As described above, even when the position of the screw 60*b* is not situated at the horizontal-direction center of the control circuit board 143 in FIG. 10, the electromagnetic shield 37 can be connected with the grounding bus bar 383. Similarly, it does not pose any problem that the position of the screw 60*a* is not situated at the horizontal-direction center of the control circuit board 143 in FIG. 10. This is because it is only necessary that the grounding bus bar 383 connects the GND strip conductor 142 of the control circuit board 14 with the electromagnetic shield 37. Adjustment of the respective positions of the screws 60*a* and 60*b* increases the degree of flexibility in designing, and hence the contact between the other components and the foregoing screws can readily be avoided. As a result, this method can contribute to downsizing and cost reduction of the electric rotating machine apparatus 103.

5. Embodiment 5

Figure 11:
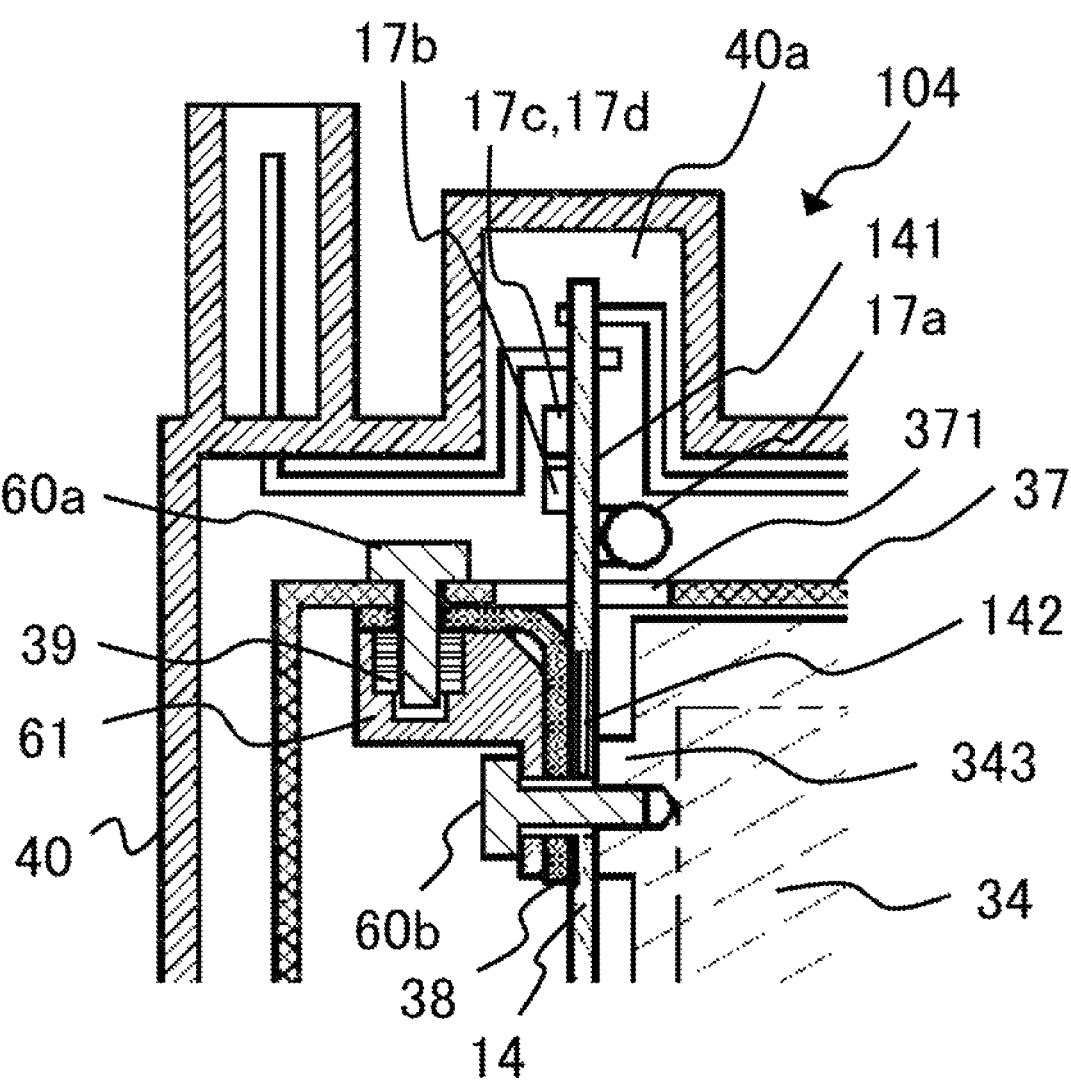
FIG. 11 is an enlarged view of a side cross section, taken along the center axis, of an electric rotating machine apparatus according to Embodiment 5.

FIG. 11 is an enlarged view of a side cross section, taken along the center axis, of an electric rotating machine apparatus 104 according to Embodiment 5.

FIG. 11 is different from FIG. 4 according to Embodiment 1 in that the coil 17*a* is provided on the protruding portion 141 of the control circuit board 14. The coil 17*a* is included in the filter unit 17, along with the X capacitor 17*b*, and the Y capacitor 17*c* and 17*d* arranged on the control circuit board. As described above, because the component included in the filter unit 17 are provided on the protruding portion 141 of the control circuit board 14, the filter unit 17 can reduce noise after the electromagnetic shield 37 has absorbed it.

6. Embodiment 6

Figure 12:
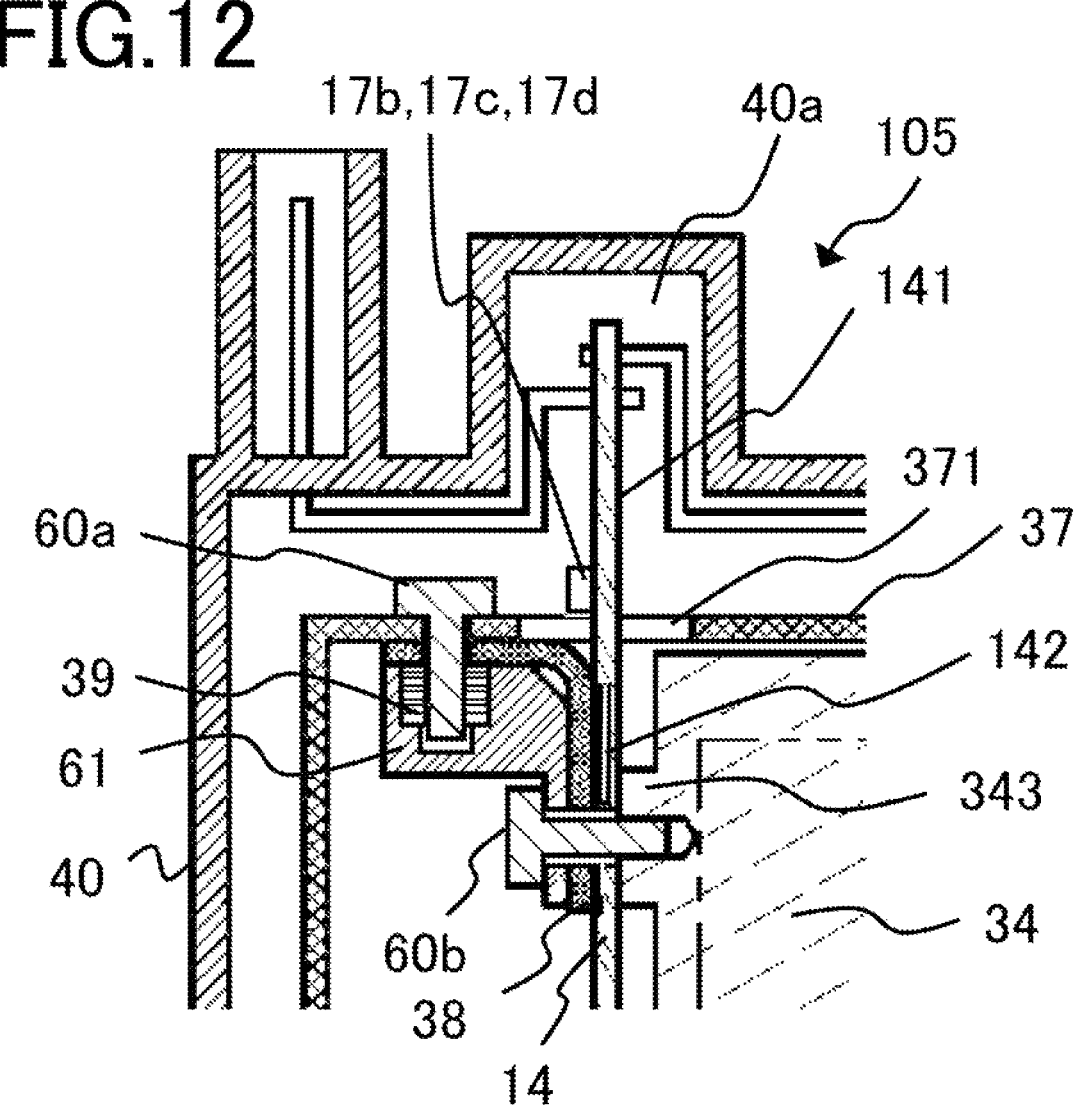
FIG. 12 is an enlarged view of a side cross section, taken along the center axis, of an electric rotating machine apparatus according to Embodiment 6.

FIG. 12 is an enlarged view of a side cross section, taken along the center axis, of an electric rotating machine apparatus 105 according to Embodiment 6.

In contrast to FIG. 4 according to Embodiment 1, in FIG. 12, parts or all of the X capacitor 17*b* and the Y capacitors 17*c* and 17*d* mounted on the protruding portion 141 of the control circuit board 14 are provided at the positions where the respective side surfaces of the capacitors make contact with the outer surface of the through hole 371 in the electromagnetic shield 37. Arrangement of the capacitors, which are the components of the filter unit 17, in such a manner as described above makes it possible that immediately after the electromagnetic shield 37 absorbs noise, the filter unit reduces the noise; therefore, this method is significant.

7. Embodiment 7

Figure 13:
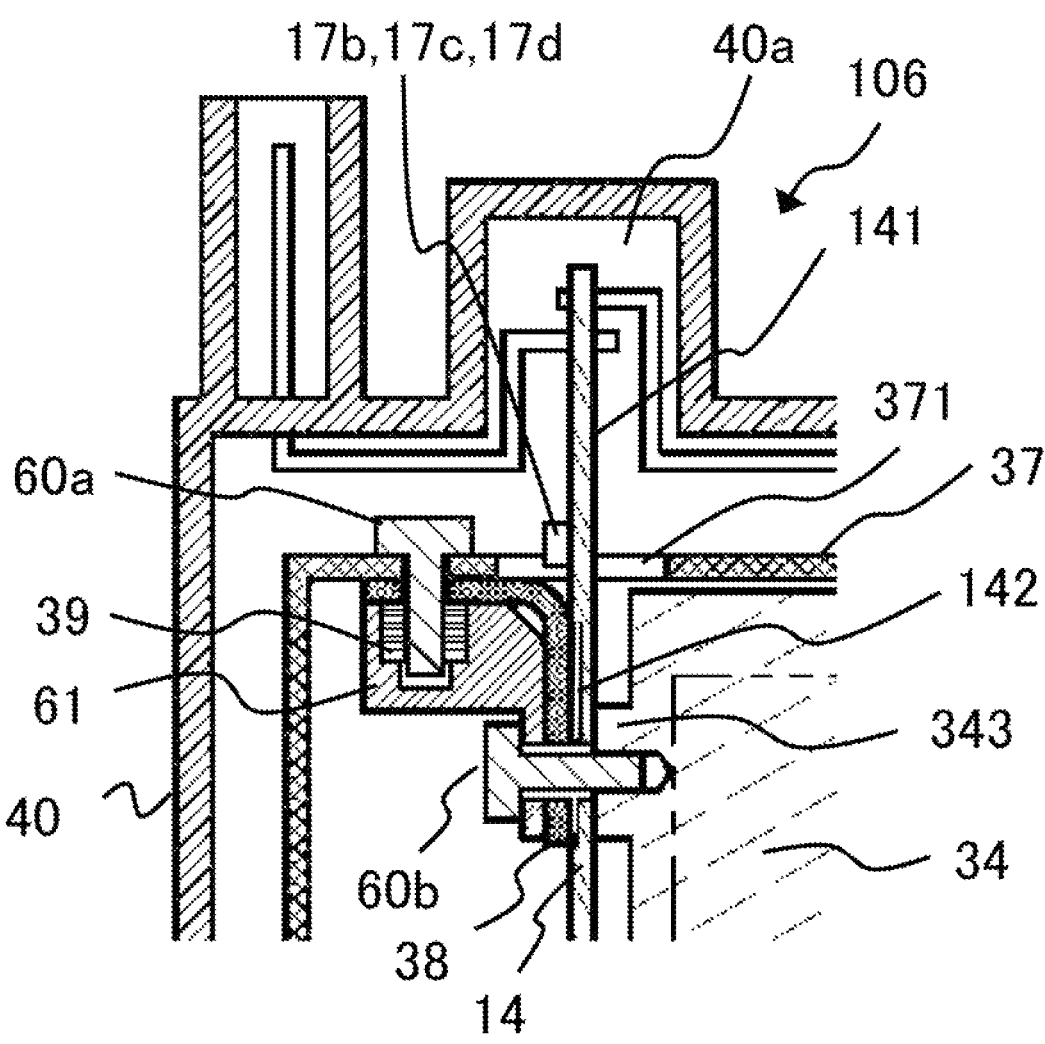
FIG. 13 is an enlarged view of a side cross section, taken along the center axis, of an electric rotating machine apparatus according to Embodiment 7.

FIG. 13 is an enlarged view of a side cross section, taken along the center axis, of an electric rotating machine apparatus 106 according to Embodiment 7.

In contrast to FIG. 12 according to Embodiment 6, in FIG. 13, parts or all of the X capacitor 17*b* and the Y capacitors 17*c* and 17*d* mounted on the protruding portion 141 of the control circuit board 14 are situated at the positions where the respective side surfaces of the capacitors cross the outer surface of the through hole 371 in the electromagnetic shield 37. Arrangement of the capacitors, which are the components of the filter unit 17, in such a manner as described above makes it possible that immediately after the electromagnetic shield 37 absorbs noise, the filter unit reduces the noise; therefore, this method is significant.

8. Embodiment 8

Figure 14:
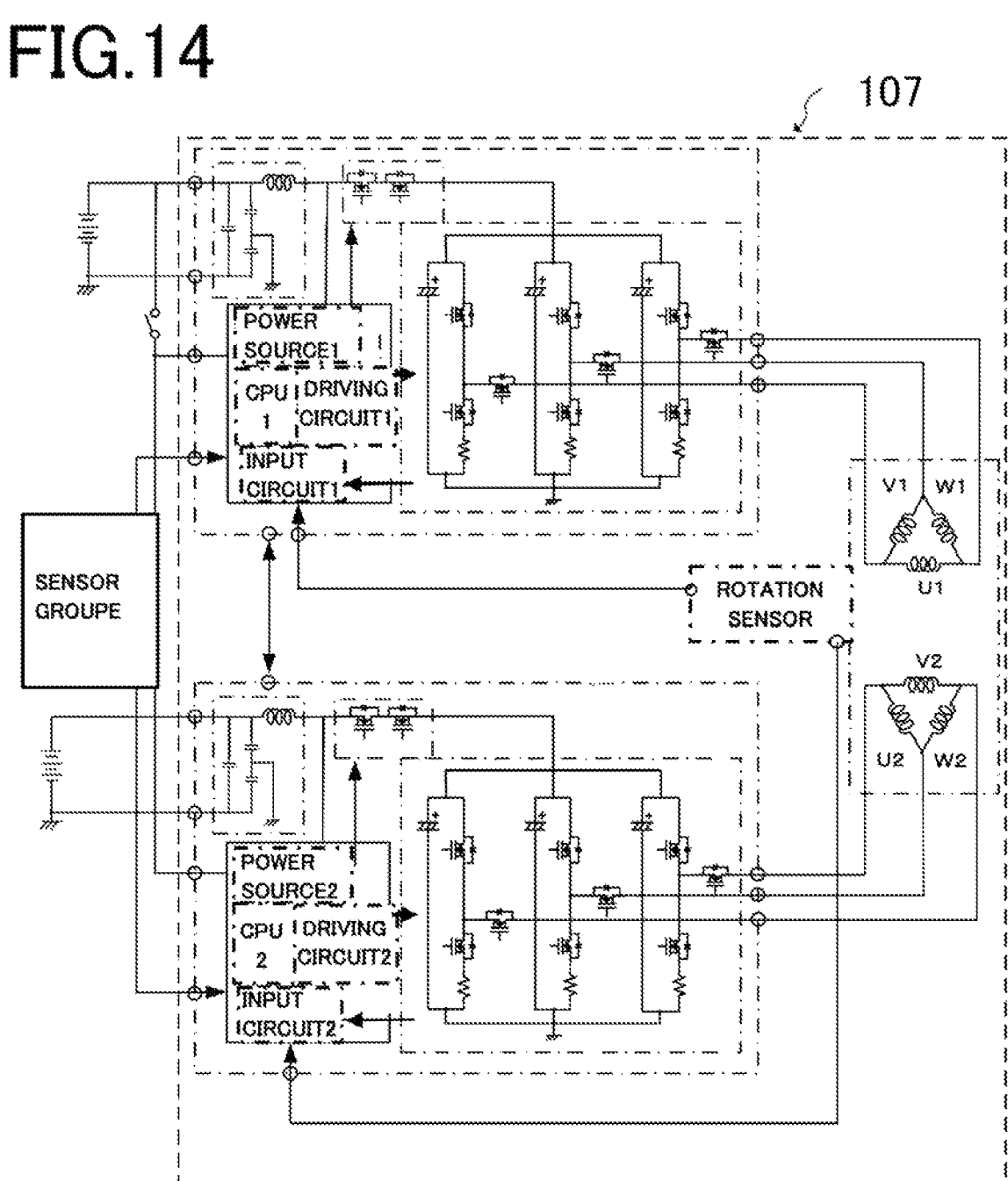
FIG. 14 is a circuit diagram of an electric rotating machine apparatus according to Embodiment 8.
Figure 15:
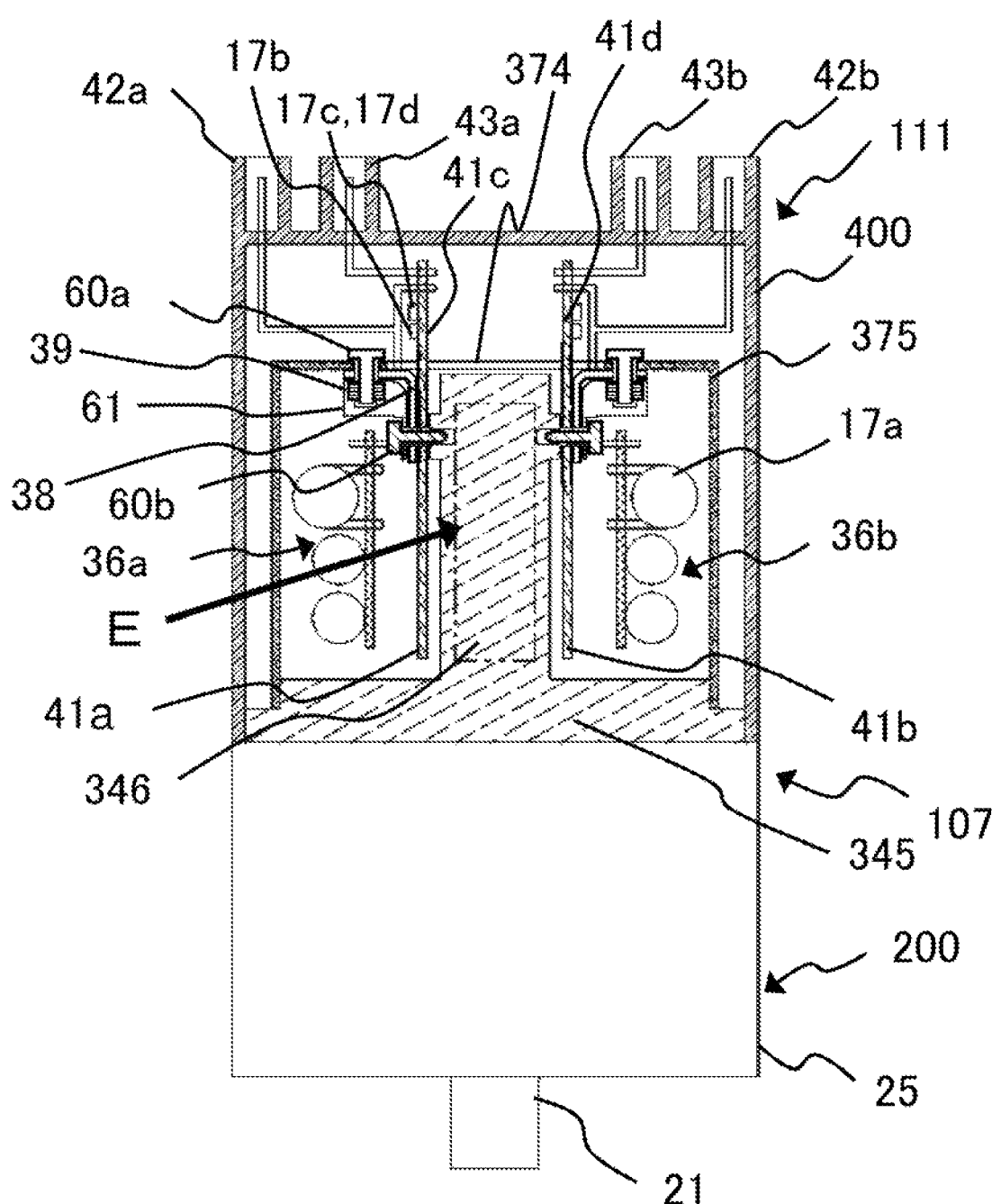
FIG. 15 is a side cross-sectional view of the electric rotating machine apparatus according to Embodiment 8.
Figure 16:
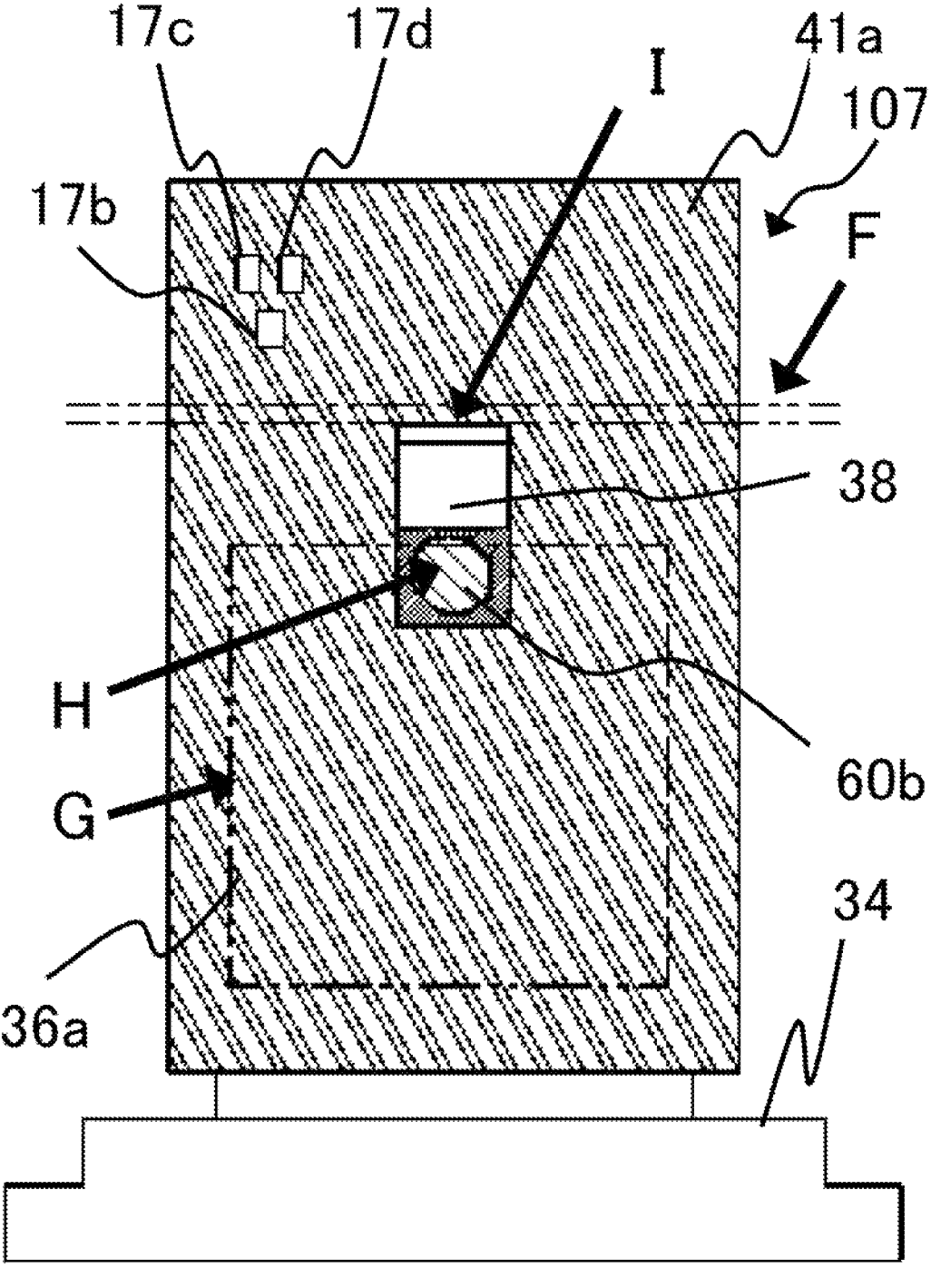
FIG. 16 is a first front view of an electric rotating machine apparatus according to Embodiment 8.
Figure 17:
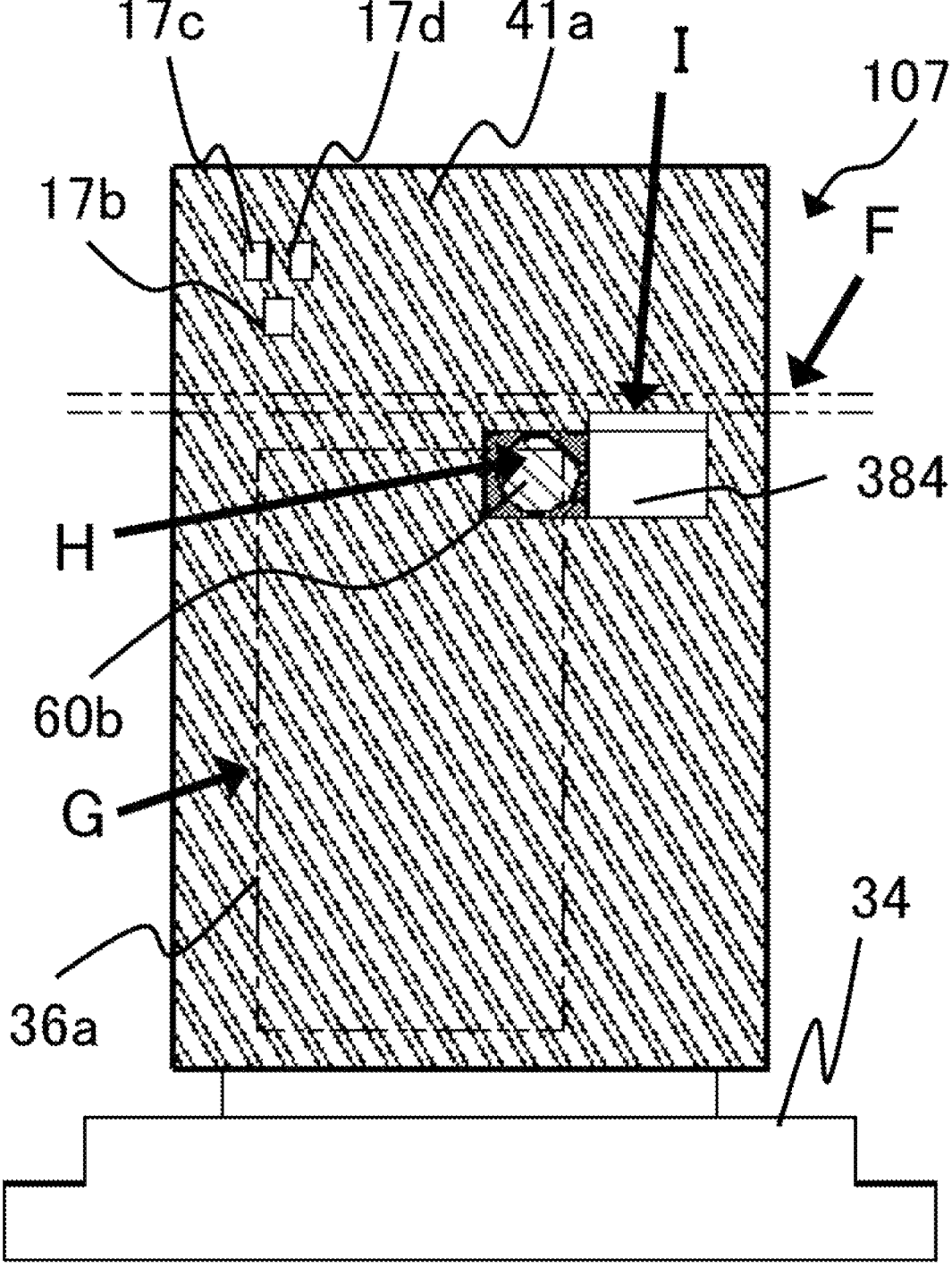
FIG. 17 is a second front view of an electric rotating machine apparatus according to Embodiment 8.

FIG. 14 is a circuit diagram of an electric rotating machine apparatus 107 according to Embodiment 8. FIG. 15 is a side cross-sectional view of the electric rotating machine apparatus 107 according to Embodiment 8. FIG. 16 is a first front view of the electric rotating machine apparatus 107 according to Embodiment 8. FIG. 17 is a second front view of the electric rotating machine apparatus 107 according to Embodiment 8.

The electric rotating machine apparatus 107 according to Embodiment 8 are configured in such a way as to have two control systems in which the control circuits are independent from each other, the connectors are independent from each other, and the sensors are independent from each other so that the redundancy is secured. FIG. 14 is a diagram representing two common electric circuits according to Embodiment 8. This configuration has two electric systems each of which is the same as the electric system that has been explained in FIG. 1 according to Embodiment 1.

The structure of the electric rotating machine apparatus 107 according to Embodiment 8 in FIG. 15 will be explained below. The top portion and the outer circumference of the control unit 111 are covered with a housing 400. On the top portion of the housing 400, there are arranged power-source connectors 42a and 42b in each of which a large current flows and signal connectors 43a and 43b in each of which a small current flows. The power-source connectors 42a and 42b, the signal connectors 43a and 43b, and the housing 400 are integrally molded with one another by means of a resin material.

In the control unit 111, a heat sink 345 is disposed at the middle portion thereof inside the housing 400. In the middle of the heat sink 345, there is disposed a columnar portion 346 whose cross section is formed in the shape of a rectangular column. The control circuit board 41a is vertically disposed along the side surface of one of the long sides of the cross section of the columnar portion 346 of the heat sink 345. The control circuit board 41b is vertically disposed along the side surface of the other one of the long sides of the cross section of the columnar portion 346 of the heat sink 345.

A bus bar unit 36a is disposed at the outer circumferential side of the control circuit board 41a. A bus bar unit 36b is disposed at the outer circumferential side of the control circuit board 41b. A power module 35a is vertically disposed at the position of a double-dot chain line, indicated by the arrow E, along the side surface of one of the short sides of the cross section of the columnar portion 346 of the heat sink 345; a power module 35b is vertically disposed along the side surface of the other one of the short sides of the cross section of the columnar portion 346 of the heat sink 345. Although not illustrated, each of the power modules 35a and 35b has a control-circuit-board connecting terminal at one of the short sides of the cross section of the columnar portion 346 of the heat sink 345 and a bus-bar-unit connecting terminal at the other one of the short sides of the cross section of the columnar portion 346 of the heat sink 345; the control-circuit-board connecting terminal is connected through soldering; the bus-bar-unit connecting terminal is connected through TIG welding or the like.

As is the same with Embodiment 1, the base portion 342 of the heat sink 345 is provided with an electromagnetic shield 375; the respective top portions of the control circuit boards 41a and 41b pass through a through hole 374 provided in the top portion of the electromagnetic shield and protrude from the electromagnetic shield 375, so that protruding portions 41c and 41d are formed. The X capacitor 17b and the Y capacitors 17c and 17d are arranged on each of the protruding portions 41c and 41d.

The grounding bus bar 38, the resin holder 61, the hexagonal nut 39, the screw 60a, and the screw 60b are provided at the outer circumferential side of each of the control circuit boards 41a and 41b; the grounding bus bar 38 is connected with the electromagnetic shield 375 through screwing, so that the GND strip conductors (unillustrated) of the respective filter units 17 of the control circuit boards 41a and 41b are connected with the electromagnetic shield 375. In the present embodiment, a connection method the same as that in Embodiment 1 is adopted; however, a connection method the same as that in Embodiment 2 or 3 may be adopted.

FIG. 16 is a first front view of the electric rotating machine apparatus 107 according to Embodiment 8. FIG. 17 is a second front view of the electric rotating machine apparatus 107 according to Embodiment 8 and is a variant example of the electric rotating machine apparatus 107 in FIG. 16. The double-dot chain line indicated by the arrow F shows the position of the top surface of the electromagnetic shield 375. The portion surrounded by a double-dot chain line indicated by the arrow G is a view illustrating the position of the bus bar unit 36a. As illustrated in FIGS. 15, 16, and 17, the bus bar unit 36 is disposed spaced apart from the screwing portion, of the grounding bus bar 38 or 384, that is at the control circuit board 41a side and is indicated by the arrow H.

As described above, three-dimensional arrangement of the grounding bus bar 38 or 384 and the bus bar unit 36 can suppress the space for disposing the grounding bus bar 38 or 384; thus, the control unit 111 can be downsized. As illustrated in FIG. 16, the screwing portion that is at the control circuit board 41a side and is indicated by the arrow H and the screwing portion that is at the electromagnetic shield 37 side and is indicated by the arrow I may be situated at the respective horizontal-direction middle positions of the control circuit board 41a and 41b in FIG. 16, as is the case with Embodiment 1. Moreover, as illustrated in FIG. 17, the screwing portions may be shifted in the horizontal direction. In addition, the bus bar unit 36 at the control circuit board 41b can similarly be disposed. The arrow G in each of FIGS. 16 and 17 indicates the situation in which the bus bar unit 36a, 36b is arranged avoiding the structure at the portion where the grounding bus bar 38, 384 is connected with the control circuit board 41a, 41b and the electromagnetic shield 375. The connection structure of the grounding bus bar 38, 384 can be disposed in such a way as to avoid interfere with the bus bar unit 36a, 36b; thus, this method contributes to downsizing and cost reduction of the electric rotating machine apparatus 107.

9. Embodiment 9

Figure 18:
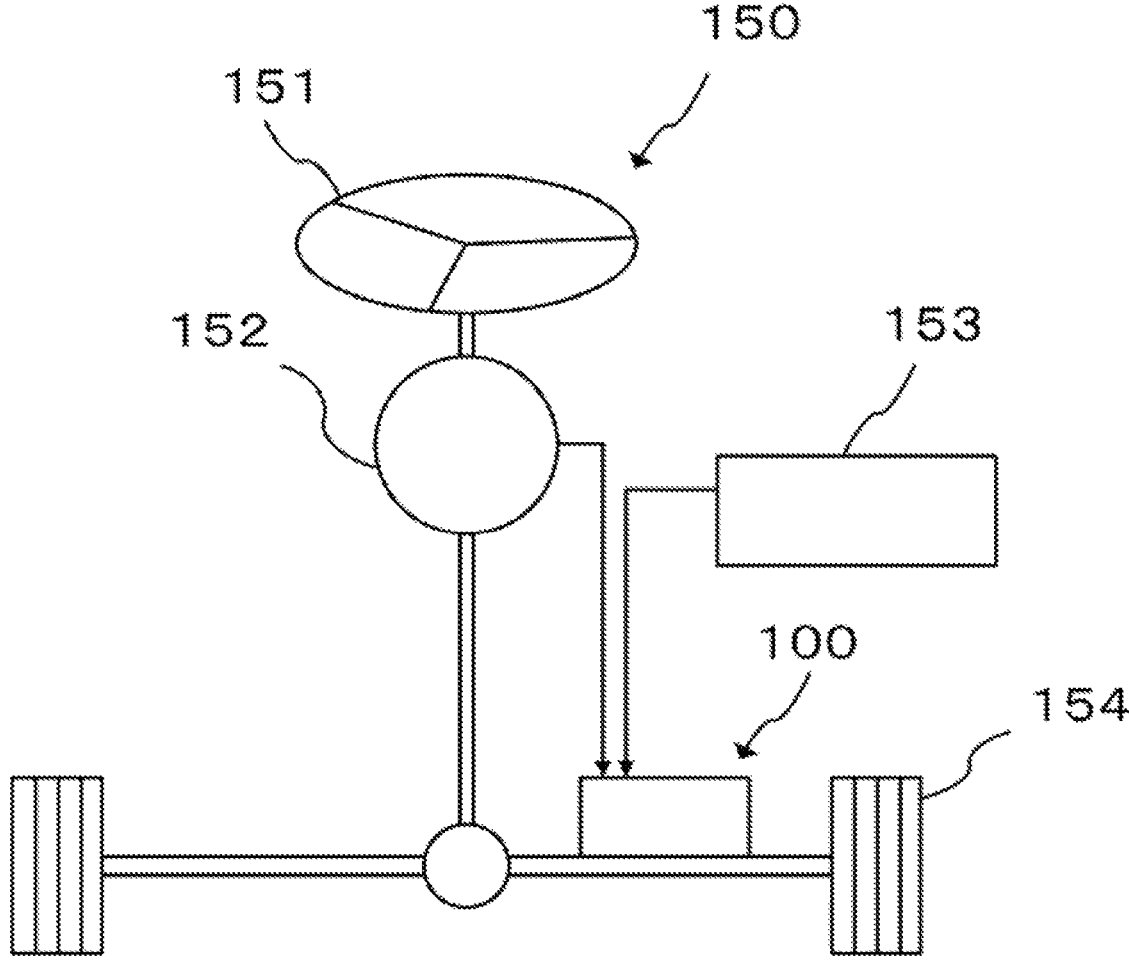
FIG. 18 is a configuration diagram of an electric power steering apparatus according to Embodiment 9.

FIG. 18 is a configuration diagram of an electric power steering apparatus 150 according to Embodiment 9. There will be explained an example in which the electric rotating machine apparatus 100 is applied to the electric power steering apparatus 150 to be mounted in a vehicle.

FIG. 18 is an overall configuration diagram of the electric power steering apparatus 150 and illustrates an example of the rack-type electric power steering apparatus 150. When a driver makes the steering mechanism of a vehicle generate steering torque by means of a steering wheel 151, a torque sensor 152 detects the steering torque and then outputs it to the electric rotating machine apparatus 100. In addition, a speed sensor 153 detects the traveling speed of the vehicle and then outputs it to the electric rotating machine apparatus 100. Based on the inputs from the torque sensor 152 and the speed sensor 153, the electric rotating machine apparatus 100 generates auxiliary torque for supplementing the steering torque and then supplies it to the steering mechanism of front wheels 154 of the vehicle. The torque sensor 152 and the speed sensor 153 are included in the sensor group 8 in FIG. 1. It may be allowed that the electric rotating machine apparatus 100 generates auxiliary torque based on inputs other than the inputs from the torque sensor 152 and the speed sensor 153.

Downsizing of the electric rotating machine apparatus 100 to be applied to the electric power steering apparatus 150 raises the mountability for the vehicle. The cost reduction of the electric rotating machine apparatus 100 results in cost reduction of the whole electric power steering apparatus 150. The same effect can be demonstrated even when instead of the electric rotating machine apparatus 100, any one of the electric rotating machine apparatuses 101 through 107 is utilized.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

DESCRIPTION OF REFERENCE NUMERALS

1: control unit
2: electric rotating machine
14, 41*a*, 41*b*, 143: control circuit board
17: filter unit
17*a*: coil
17*a*, 17*c*, 17*d*: capacitor
34: heat sink
37, 375: electromagnetic shield
38, 381, 382, 383: grounding bus bar
39: hexagonal nut
40: housing
41*c*, 41*d*, 141: protruding portion
21: output axle
60*a*, 60*b*: screw
61: resin holder
100, 101, 102, 103, 104, 105, 106: electric rotating machine apparatus
142: GND strip conductor
150: electric power steering apparatus

371: through hole

What is claimed is:

1. An electric rotating machine apparatus comprising:
an electric rotating machine having a rotation axle;
a controller that is disposed at one axial-direction side of the rotation axle with respect to the electric rotating machine and controls the electric rotating machine;
a control circuit board that is provided in the controller and has a protruding portion where a portion of the control circuit board extends toward the one axial-direction side of the rotation axle;
an electromagnetic shield that surrounds the controller and is provided with a through hole that is penetrated by the protruding portion of the control circuit board;
an external connection terminal that is disposed outside the electromagnetic shield and is mounted in the protruding portion of the control circuit board; and
a filter that is disposed outside the electromagnetic shield and is mounted on the protruding portion of the control circuit board so as to attenuate noise components that propagate to the external connection terminal.

2. The electric rotating machine apparatus according to claim 1,
wherein the filter and the external connection terminal are connected via the control circuit board, and wherein there is provided a grounding bus bar electrically connected with a GND strip conductor of the control circuit board and the electromagnetic shield.

3. The electric rotating machine apparatus according to claim 2, further comprising a heat sink, a resin member, and a first screw that screws
the control circuit board, the grounding bus bar, and the resin member to the heat sink,
wherein the GND strip conductor of the control circuit board and the grounding bus bar are electrically connected with each other.

4. The electric rotating machine apparatus according to claim 3, wherein the heat sink is disposed at a center-axis side of the electric rotating machine, the control circuit board is disposed at an outer circumferential side of the heat sink, the grounding bus bar is provided at an outer circumferential side of the control circuit board, and the resin member is disposed at an outermost circumferential side.

5. The electric rotating machine apparatus according to claim 2, further comprising a second screw that screws,
the electromagnetic shield to the grounding bus bar,
wherein the grounding bus bar and the electromagnetic shield are electrically connected with each other.

6. The electric rotating machine apparatus according to claim 2, further comprising a second screw and a nut,
wherein the grounding bus bar and the electromagnetic shield are screwed together with the nut and the second screw, and
wherein the grounding bus bar and the electromagnetic shield are electrically connected with each other.

7. The electric rotating machine apparatus according to claim 5, wherein the electromagnetic shield is disposed at the one axial-direction side of the grounding bus bar.

8. The electric rotating machine apparatus according to claim 2, further comprising the grounding bus bar that is fixed to the GND strip conductor of the control circuit board through soldering and is abutted to the electromagnetic shield through pressing contact so as to be electrically connected with the GND strip conductor of the control circuit board and the electromagnetic shield.

9. The electric rotating machine apparatus according to claim 8, wherein the grounding bus bar is a leaf-spring-like elastic member.

10. The electric rotating machine apparatus according to claim 1, further comprising a first screw that screws the control circuit board, the grounding bus bar, and the resin member to the heat sink, a second screw that screws the electromagnetic shield to the grounding bus bar, and a grounding bus bar that is mounted to the control circuit board with the first screw and is mounted to the electromagnetic shield with the second screw, wherein respective center axes of the first screw and the second screw are arranged on one and the same plane that encompasses the center axis of the electric rotating machine.

11. The electric rotating machine apparatus according to claim 1, further comprising a first screw that screws the control circuit board, the grounding bus bar, and the resin member to the heat sink, a second screw that screws the electromagnetic shield to the grounding bus bar, and a grounding bus bar that is mounted to the control circuit board with the first screw and is mounted to the electromagnetic shield with the second screw, wherein the center axis of the first screw is disposed on a first plane parallel to the center axis of the electric rotating machine, and the center axis of the second screw is disposed on a second plane parallel to the first plane.

12. The electric rotating machine apparatus according to claim 10, wherein the center axis of the first screw is disposed perpendicularly to the control circuit board, and the center axis of the second screw is disposed perpendicularly to the electromagnetic shield.

13. The electric rotating machine apparatus according to claim 2, wherein there is provided a bus bar on which a large component is mounted and that is disposed in parallel with the control circuit board in such a way as to be spaced apart from a mounting portion between the control circuit board and the grounding bus bar.

14. The electric rotating machine apparatus according to claim 1, wherein there is provided a housing that incorporates the protruding portion of the control circuit board and the external connection terminal connected with the protruding portion and covers an outside of the electromagnetic shield so as to protect inside components.

15. The electric rotating machine apparatus according to claim 14, wherein the housing has a convex portion, and the protruding portion of the control circuit board is incorporated in the convex portion of the housing.

16. The electric rotating machine apparatus according to claim 1, wherein the filter mounted on the protruding portion of the control circuit board is a capacitor.

17. The electric rotating machine apparatus according to claim 1, wherein the filter mounted on the protruding portion of the control circuit board includes a capacitor and a coil.

18. The electric rotating machine apparatus according to claim 16, wherein the capacitor is provided at a position, on the protruding portion of the control circuit board, where a side surface of the capacitor makes contact with an outer surface of the through hole provided in the electromagnetic shield.

19. The electric rotating machine apparatus according to claim 16, wherein the capacitor is provided at a position, on the protruding portion of the control circuit board, where the capacitor crosses an outer surface of the through hole provided in the electromagnetic shield.

20. An electric power steering apparatus having the electric rotating machine apparatus according to claim 1.

* * * * *